US012560282B2

(12) United States Patent
Park et al.

(10) Patent No.: US 12,560,282 B2
(45) Date of Patent: Feb. 24, 2026

(54) LIQUEFIED GAS STORAGE TANK AND SHIP INCLUDING SAME

(71) Applicant: HYUNDAI HEAVY INDUSTRIES CO., LTD., Ulsan (KR)

(72) Inventors: Cheon Jin Park, Ulsan (KR); Byung Ki Choi, Ulsan (KR); Hoon Kyu Oh, Ulsan (KR); Hong Il Im, Ulsan (KR); Min Kyu Park, Ulsan (KR); Sang Ok Lee, Ulsan (KR); Seong Bo Park, Ulsan (KR); Yong Tai Kim, Ulsan (KR); Won Seok Heo, Ulsan (KR); Dong Woo Kim, Ulsan (KR); Jae Hyeok Ahn, Ulsan (KR); Young Moo Son, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 603 days.

(21) Appl. No.: 17/928,877

(22) PCT Filed: Jul. 1, 2021

(86) PCT No.: PCT/KR2021/008387
§ 371 (c)(1),
(2) Date: Nov. 30, 2022

(87) PCT Pub. No.: WO2022/010184
PCT Pub. Date: Jan. 13, 2022

(65) Prior Publication Data

US 2023/0228379 A1 Jul. 20, 2023

(30) Foreign Application Priority Data

Jul. 8, 2020 (KR) ........................ 10-2020-0084336
Jul. 17, 2020 (KR) ........................ 10-2020-0089200

(51) Int. Cl.
*B63B 25/16* (2006.01)
*F17C 3/02* (2006.01)

(52) U.S. Cl.
CPC .............. *F17C 3/027* (2013.01); *B63B 25/16* (2013.01); *F17C 3/025* (2013.01);
(Continued)

(58) Field of Classification Search
CPC . B63B 25/00; B63B 25/16; F17C 3/00; F17C 3/02; F17C 3/027; F17C 3/04;
(Continued)

(56) References Cited

U.S. PATENT DOCUMENTS 6,378,722 B1 4/2002 Dhellemmes
2018/0112823 A1 4/2018 Ducloy et al.

FOREIGN PATENT DOCUMENTS

CN 10-6573664 A 4/2017
DE 102006016796 A1 10/2007
(Continued)

OTHER PUBLICATIONS

Office Action on the Japanese Patent Application No. 2022-573754 issued by the Japanese Patent Office on Oct. 24, 2023.
(Continued)

*Primary Examiner* — Lars A Olson
(74) *Attorney, Agent, or Firm* — IP & T GROUP LLP

(57) ABSTRACT

The present disclosure relates to a liquefied gas storage tank and a ship including the same. A liquefied gas storage tank according to the present disclosure is a liquefied gas storage tank for storing a cryogenic material and includes a primary barrier made of metal to form an accommodating space for accommodating a cryogenic material; a primary insulating wall in which a primary plywood and a primary insulating material are sequentially disposed to the outside of the primary barrier; a secondary barrier provided on the outside
(Continued)

of the primary insulating wall; and a secondary insulating wall in which a secondary insulating material and a secondary plywood are sequentially disposed in a stack to the outside of the secondary barrier, wherein the secondary barrier includes a main barrier provided on top of each secondary insulating wall constituting a unit element; and an auxiliary barrier connecting the adjacent main barriers to each other, the secondary barrier is formed of a mixed material of a metal and a non-metal, and the primary insulating wall has a thickness of 66% to 166% of that of the secondary insulating wall in order to lower a thermal stress.

19 Claims, 28 Drawing Sheets

(52) U.S. Cl.
CPC ................. *F17C 2203/0333* (2013.01); *F17C 2203/0631* (2013.01); *F17C 2203/0646* (2013.01); *F17C 2221/033* (2013.01); *F17C 2223/0161* (2013.01); *F17C 2270/0107* (2013.01)

(58) Field of Classification Search
CPC .............. F17C 3/025; F17C 2203/0333; F17C 2203/0631; F17C 2203/0646; F17C 2221/033; F17C 2223/0161; F17C 2270/0107
USPC ........................................................ 114/74 A
See application file for complete search history.

(56) References Cited

FOREIGN PATENT DOCUMENTS

| | | | |
|---|---|---|---|
| JP | 2008110813 | A | 5/2008 |
| JP | 2010528241 | A | 8/2010 |
| JP | 2011519005 | A | 6/2011 |
| JP | 2011-158388 | A | 8/2011 |
| JP | 2017516030 | A | 6/2017 |
| JP | 2018512344 | A | 5/2018 |
| KR | 10-2005-0108692 | A | 11/2005 |
| KR | 10-2006-0086071 | A | 7/2006 |
| KR | 10-0638985 | B1 | 10/2006 |
| KR | 10-0782737 | B1 | 12/2007 |
| KR | 10-0833028 | B1 | 5/2008 |
| KR | 10-0868704 | B1 | 11/2008 |
| KR | 10-2010-0069375 | A | 6/2010 |
| KR | 10-1031265 | B1 | 4/2011 |
| KR | 10-1337642 | B | 12/2013 |
| KR | 10-2014-0041971 | A | 4/2014 |
| KR | 10-1454617 | B1 | 10/2014 |
| KR | 10-1556259 | B1 | 9/2015 |
| KR | 10-2016-0021351 | A | 2/2016 |
| KR | 10-1617036 | B1 | 5/2016 |
| KR | 10-2016-0113411 | A | 9/2016 |
| KR | 10-2016-0123020 | A | 10/2016 |
| KR | 10-2044272 | B1 | 11/2019 |
| KR | 10-2090266 | B1 | 3/2020 |

OTHER PUBLICATIONS

Written Opinion for Singapore Patent Application No. 11202260747P issued by the Intellectual Property Office of Singapore on Dec. 5, 2024.

Extended European Search Report for European Patent Application No. 21838635.7 issued by the European Patent Office on Jan. 17, 2025.

Notice of Allowance for Chinese Patent Application No. 202180039027.X issued by the Chinese Patent Office on Sep. 8, 2025.

LIQUEFIED GAS STORAGE TANK AND SHIP INCLUDING SAME

This application is a national stage application of PCT/KR2021/008387 filed on Jul. 1, 2021, which claims Korean patent application number 10-2020-0084336 filed on Jul. 8, 2020 and Korean patent application number 10-2020-0089200 filed on Jul. 17, 2020. The disclosure of each of the foregoing applications is incorporated herein by reference in its entirety.

TECHNICAL FIELD

The present disclosure relates to a liquefied gas storage tank and a ship including the same.

BACKGROUND ART

According to recent technology development, liquefied gas such as liquefied natural gas (LNG) and liquefied petroleum gas (LPG) is widely used to replace gasoline or diesel.

In addition, a storage tank (referred to as a "cargo hold") for storing LNG in a cryogenic liquid state is installed in a ship such as an LNG carrier that transports or stores liquefied gas such as LNG at sea, LNG regasification vessel (LNG RV), LNG floating, production, storage and offloading (LNG FPSO), and LNG floating storage and regasification unit (LNG FSRU).

In addition, the liquefied gas storage tank may generate boil off gas (BOG) by intrusion of heat from the outside, and reducing the boil off rate (BOR) which is the vaporization ratio of BOG through an adiabatic design is a key technology in the design of a liquefied gas storage tank. In addition, since the liquefied gas storage tank is exposed to various loads such as sloshing, it may be essential to secure the mechanical strength of the insulation panel.

Considering the above, the thickness range of the primary insulating wall and the secondary insulating wall may be related to the mechanical strength of the liquefied gas storage tank. Accordingly, studies are being actively conducted to remove the low-temperature burden of the secondary barrier while maintaining the mechanical strength of the secondary insulating wall.

In addition, in the case of the primary barrier, since it is directly exposed to cryogenic materials, in order to minimize the thermal stress caused by cryogenic temperatures as well as the pressure stress burden caused by sloshing, researches on optimizing the cross-sectional shape of the curved portion are being actively conducted.

DISCLOSURE OF THE INVENTION

Technical Goals

The present disclosure has been proposed to solve the problems of the related art as described above, and an object of the present disclosure is to provide a liquefied gas storage tank and a ship including the same capable of optimizing the cross-sectional shape of the curved portion of the primary barrier to minimize the thermal stress caused by low temperatures as well as the pressure stress burden caused by sloshing.

In addition, an object of the present disclosure is to provide a liquefied gas storage tank and a ship including the same capable of reducing the low-temperature burden and sloshing burden of the secondary barrier while maintaining the mechanical strength of the secondary insulating wall at a certain level, by making the thickness of the primary insulating wall equal to or similar to that of the secondary insulating wall in the total thickness of the insulating wall.

In addition, an object of the present disclosure is to provide a liquefied gas storage tank and a ship including the same capable of reducing the low-temperature burden and sloshing burden of the secondary barrier in the range where brittle fracture of the hull does not occur, by making the thickness of the primary insulating wall equal to or similar to that of the secondary insulating wall in the total thickness of the insulating wall.

In addition, an object of the present disclosure is to provide a liquefied gas storage tank and a ship including the same capable of increasing thermal insulation performance, by improving the configuration of the secondary barrier.

In addition, an object of the present disclosure is to provide a liquefied gas storage tank and a ship including the same capable of improving the configuration of the fixing member that fixes the secondary insulating wall to the hull to increase insulation performance as well as reduce man-hours.

Technical Solutions

A liquefied gas storage tank according to an aspect of the present disclosure is a liquefied gas storage tank for storing a cryogenic material including a primary barrier made of metal to form an accommodating space for accommodating a cryogenic material; a primary insulating wall in which a primary plywood and a primary insulating material are sequentially disposed to the outside of the primary barrier; a secondary barrier provided on the outside of the primary insulating wall; and a secondary insulating wall in which a secondary insulating material and a secondary plywood are sequentially disposed in a stack to the outside of the secondary barrier, wherein the secondary barrier includes a main barrier provided on top of each secondary insulating wall constituting a unit element; and an auxiliary barrier connecting the adjacent main barriers to each other, the secondary barrier is formed of a mixed material of a metal and a non-metal, and the primary insulating wall has a thickness of 66% to 166% of that of the secondary insulating wall in order to lower a thermal stress.

Specifically, the primary insulating wall may include a connection insulating wall provided in a space portion between adjacent fixed insulating walls in a state where unit elements formed by stacking the secondary insulating wall, the secondary barrier, and the fixed insulating wall which is a part of the primary insulating wall are disposed adjacently.

Specifically, the connection insulating wall may have a thickness of 67% to 167% of the secondary insulating wall.

Specifically, the secondary barrier may be disposed in a central region corresponding to 40% to 60% of a total thickness based on a thickness direction in the liquefied gas storage tank.

Specifically, the primary insulating material may have a thickness of 90% to 110% of the secondary insulating material.

Specifically, the primary barrier may include a flat portion in contact with an upper surface of the primary insulating wall, a curved portion having a first curvature radius, and a boundary portion formed in a wrinkle shape having a second curvature radius between the flat portion and the curved portion, and the first curvature radius and the second curvature radius may be different.

Specifically, the wrinkle shape may have the same horizontal and vertical wrinkle sizes.

Specifically, the secondary barrier may be formed of a material having a structure in which a first member/an aluminum foil/a second member are stacked, and at least one of the first member and the second member may be a glass fabric, a glass-aramid fabric, a basalt fabric, or a glass fabric/aluminum foil/glass fabric.

Specifically, the primary insulating material may be formed of a reinforced polyurethane foam in which CO2 is used as a blowing agent, and the secondary insulating material may be formed of a reinforced polyurethane foam in which a blowing agent HFC-245fa is used.

Specifically, the liquefied gas storage tank may further include a right-angle corner structure, wherein a curvature radius of the secondary barrier formed in the right-angle corner structure may be 25% to 50% of the thickness of the primary insulating wall.

Specifically, the liquefied gas storage tank may further include an obtuse-angle corner structure, wherein a curvature radius of the secondary barrier formed in the obtuse-angle corner structure may be 15% to 35% of the thickness of the primary insulating wall.

A liquefied gas storage tank according to another aspect of the present disclosure is a liquefied gas storage tank for storing a cryogenic material including a primary barrier made of metal to form an accommodating space for accommodating a cryogenic material; a primary insulating wall in which a primary plywood and a primary insulating material are sequentially disposed to the outside of the primary barrier; a secondary barrier provided on the outside of the primary insulating wall; and a secondary insulating wall in which a secondary insulating material and a secondary plywood are sequentially disposed in a stack to the outside of the secondary barrier, wherein the secondary barrier consists of a main barrier provided on top of each secondary insulating wall constituting a unit element; and an auxiliary barrier connecting adjacent main barriers to each other, and wherein the auxiliary barrier has a non-adhesive portion, and an upper limit of a low temperature stress of the auxiliary barrier by the cryogenic material is 50 MPa or less.

A liquefied gas storage tank according to another aspect of the present disclosure is a liquefied gas storage tank for storing a cryogenic material including a primary barrier made of metal to form an accommodating space for accommodating a cryogenic material; a primary insulating wall provided on the outside of the primary barrier; a secondary barrier provided on the outside of the primary insulating wall which includes a main barrier and an auxiliary barrier; and a secondary insulating wall provided on the outside of the secondary barrier, wherein the first barrier includes a plurality of flat portions fixed to an upper surface of the primary insulating wall, and a curved portion formed between the plurality of flat portions to form a curved surface toward the accommodating space and including a horizontal curved portion and a vertical curved portion, wherein the curved portion includes a pair of first curved portions connected to each of the adjacent flat portions and having a first curvature radius r1; a second curved portion forming an upper portion of the curved portion and having a second curvature radius r2 with a radius at least greater than the first curvature radius r1; and a pair of third curved portions connecting each of the pair of first curved portions and the second curved portion, and having a third curvature radius r3 with a radius at least greater than the second curvature radius r2, and wherein the pair of third curved portions are positioned so that a first curvature center of any one of the third curved portions and a second curvature center of the other third curved portion are shifted in a horizontal direction inside the curved portion.

Specifically, the horizontal curved portion and the vertical curved portion may be formed to intersect, and the horizontal curved portion and the vertical curved portion may have the same height and width.

Specifically, a size of the third curvature radius may be greater than a sum of a size of the second curvature radius and a size of the first curvature radius.

Specifically, a ratio (W/H) of a width (W) to a height (H) of the curved portion may range from 2.0 to 3.0 ($2.0 \leq W/H \leq 3.0$), and may be determined based on a thermal stress and a pressure stress at low temperature of the primary barrier.

Specifically, each of the pair of first curved portions may have a curved shape having the first curvature radius between a first connection point connected to the flat portion and a second connection point connected to each of the pair of third curved portions, the first connection point may be the same location as a point where a curve of a first circle having the first curvature radius from a curvature center on the accommodating space side and a vertical center line of the first circle intersect, and the second connection point may be located on a curved portion of the first circle within an angle of 30 degrees downward from a point where the curve of the first circle and a horizontal center line of the first circle intersect.

Specifically, the primary barrier may be located within a predetermined distance from an intersection where the horizontal curved portion and the vertical curved portion intersect, and may further include a protruding structure which protrudes toward the accommodating space and is formed on the flat portion.

Specifically, the protruding structure may be smaller in size than the horizontal curved portion and the vertical curved portion, and may be formed in a convex circular or arc shape.

Specifically, the first and second curvature centers of the pair of third curved portions may be located above an imaginary plane formed by the flat portion.

A ship according to another aspect of the present disclosure is provided with the liquefied gas storage tank described above.

Advantageous Effects

A liquefied gas storage tank and a ship including the same according to the present disclosure may minimize the thermal stress due to low temperature as well as the pressure stress burden due to sloshing, by optimizing the cross-sectional shape of the curved portion of the primary barrier.

In addition, the liquefied gas storage tank and ship including the same according to the present disclosure may maintain the mechanical strength of the secondary barrier at a certain level, as well as reduce the low temperature burden and sloshing load of the secondary barrier, thereby preventing damage to the secondary barrier, by configuring the thickness of the primary insulating wall to be the same as or similar to that of the secondary insulating wall in the total thickness of the primary insulating wall and the secondary insulating wall covering the connection insulating wall.

In addition, the liquefied gas storage tank and ship including the same according to the present disclosure may prevent brittle fracture of the hull and reduce the low temperature burden and sloshing burden of the secondary barrier, by configuring the thickness of the primary insulating wall to be the same as or similar to that of the secondary insulating wall in the total thickness of the primary insulating wall and the secondary insulating wall covering the connection insulating wall.

In addition, the liquefied gas storage tank and ship including the same according to the present disclosure may further increase the thermal insulation performance in the connecting portion of the adjacent secondary insulating wall constituting the unit element, by providing an auxiliary insulating plate on the lower surface of the connection insulating wall provided in the space between the adjacent primary insulating walls constituting the unit element.

In addition, the liquefied gas storage tank and ship including the same according to the present disclosure may improve the configuration of the secondary barrier to increase the thermal insulating performance.

In addition, the liquefied gas storage tank and ship including the same according to the present disclosure may level the deformed part of the hull and increase the insulating performance of the tank even without using the existing mastic and leveling wedge, by applying a non-adhesive elastic insulating material as a leveling member of the secondary insulating wall between the secondary insulating wall and the hull.

In addition, the liquefied gas storage tank and ship including the same according to the present disclosure may save man-hours compared to the method of fixing the unit panel with stud bolts by drilling a hole in the secondary insulating wall, by fixing the unit panel of the adjacent secondary insulating wall in a cleat structure method by a protruding portion provided to protrude to the outside at the lower side of the unit panel of the secondary insulating wall and a stud bolt fixed to the hull. Man-hours can be reduced compared to the method of fixing the unit panel with stud bolts.

BEST MODE FOR CARRYING OUT THE INVENTION

Figure 1:
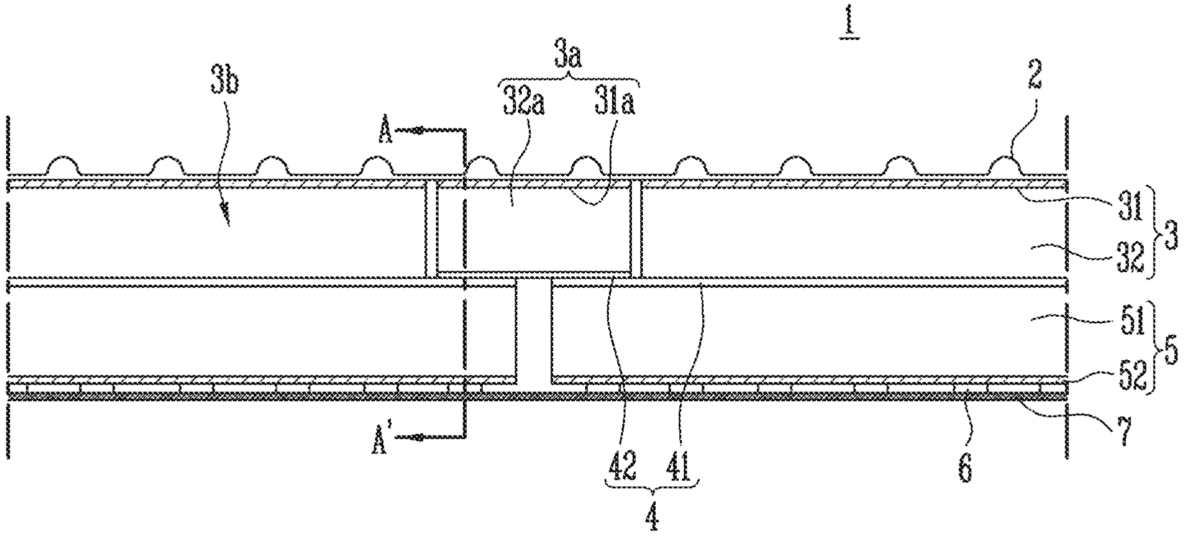
FIG. 1 is a partial cross-sectional view for explaining a liquefied gas storage tank in accordance with a first embodiment of the present disclosure.

The objects, specific advantages and novel features of the present disclosure will become more apparent from the following detailed description and preferred embodiments taken in conjunction with the accompanying drawings. In the present specification, in adding reference numerals to the components of each drawing, it should be noted that only the same components are given the same numeral as possible even though they are indicated on different drawings. In addition, in describing the present disclosure, if it is determined that a detailed description of a related known art may unnecessarily obscure the subject matter of the present invention, the detailed description thereof will be omitted.

In addition, the accompanying drawings are only for easy understanding of the embodiments disclosed in the present specification, and the technical idea disclosed in the present specification is not limited by the accompanying drawings, it should be understood to include all modifications, equivalents and substitutes included in the idea and scope of the present disclosure.

In addition, terms including an ordinal number such as first, second, etc., may be used to describe various components, but the components are not limited by the terms. The above terms are used only for the purpose of distinguishing one component from another.

Hereinafter, in this specification, liquefied gas may be used to encompass all gas fuels generally stored in a liquid state, such as LNG or LPG, ethylene, ammonia, etc., and a case that is not in a liquid state due to heating or pressurization may also be expressed as a liquefied gas for convenience. This may be applied to boil-off gas as well. In addition, for convenience, LNG may be used to encompass both natural gas (NG) in a liquid state as well as LNG in a supercritical state, etc., and the boil-off gas may be used to mean not only gaseous boil-off gas but also liquefied boil-off gas.

Hereinafter, preferred embodiments of the present disclosure will be described in detail with reference to the accompanying drawings.

Figure 2:
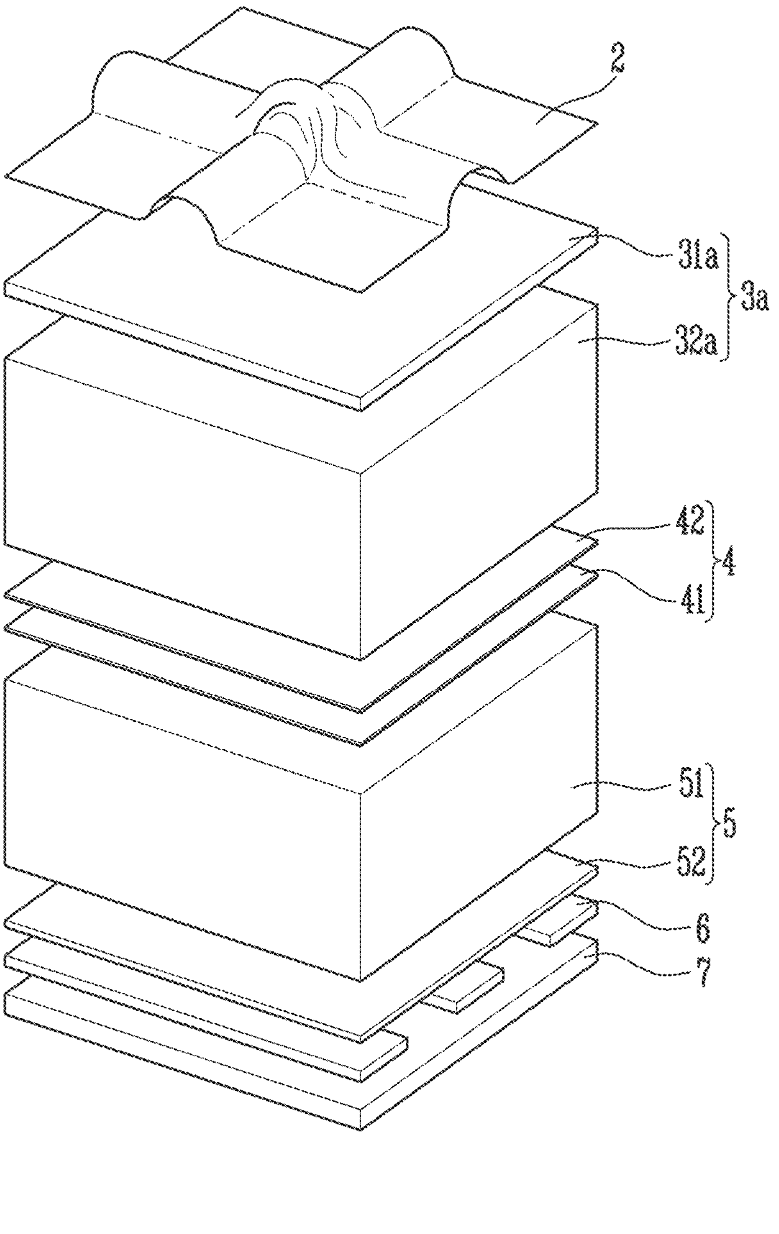
FIG. 2 is a partial perspective view for explaining the liquefied gas storage tank in accordance with the first embodiment of the present disclosure.
Figure 3:
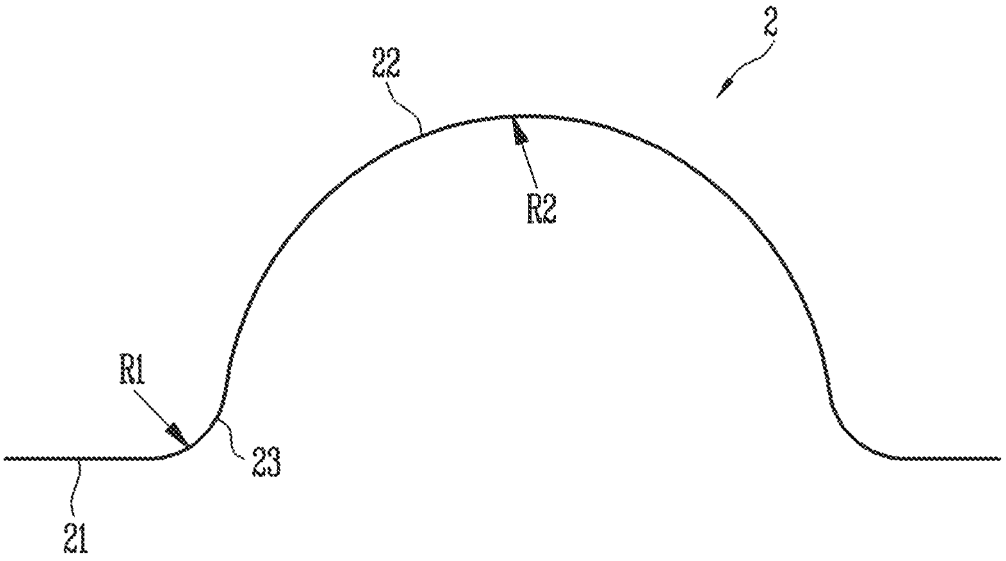
FIG. 3 is a view for explaining a primary barrier of the liquefied gas storage tank in accordance with the first embodiment of the present disclosure.

FIG. 1 is a partial cross-sectional view for explaining a liquefied gas storage tank according to a first embodiment of the present disclosure, and FIG. 2 is a partial perspective view for explaining the liquefied gas storage tank according to the first embodiment of the present disclosure. FIG. 3 is a view for explaining a primary barrier of the liquefied gas storage tank according to the first embodiment of the present disclosure.

As shown in FIGS. 1 to 2, the liquefied gas storage tank 1 according to the first embodiment of the present disclosure may be provided in a ship to store liquefied gas such as LNG, which is a cryogenic (about −160° C. to −170° C.) material.

Although not shown, it should be noted that the ship provided with the liquefied gas storage tank 1 described below is a concept encompassing offshore structures that float at a certain point on the sea and perform specific tasks in addition to commercial ships that transport cargo from a departure point to a destination. In addition, in the present disclosure, the liquefied gas storage tank 1 includes any type of tank for storing liquefied gas.

A liquefied gas storage tank 1 may be configured to include a primary barrier 2 in contact with liquefied gas, a primary insulating wall 3 installed on the outside of the primary barrier 2, a secondary barrier 4 installed on the outside of the primary insulating wall 3, and a secondary insulating wall 5 disposed on the outside of the secondary barrier 4. The liquefied gas storage tank 1 may be supported on a hull 7 by a mastic 6 installed between the secondary insulating wall 5 and the hull 7.

The liquefied gas storage tank 1 may need to optimize the thickness of the primary insulating wall 3 and the secondary insulating wall in order to optimize the thermal insulating performance and storage capacity. For example, when polyurethane foam is used as the main material for the primary insulating wall 3 and secondary insulating wall 5, the total thickness of the sum of the thickness of the primary insulating wall 3 and the thickness of the secondary insulating wall 5 may be in the range of 250 mm to 500 mm. In this regard, it will be described with reference to FIGS. 4 to 20.

In the above, the liquefied gas storage tank 1 may include a plane and a corner structure. For example, a transverse wall in the front-rear direction of the liquefied gas storage tank 1, a floor between the transverse walls, a vertical wall, and a ceiling may correspond to a plane structure. In addition, for example, a structure in which the transverse wall, the floor, the vertical wall, and the ceiling of the liquefied gas storage tank 1 meet may correspond to a corner structure. Here, the corner structure may include an obtuse-angle corner structure or a right-angle corner structure. When the thickness of the primary insulating wall 3 or the secondary insulating wall 5 is changed, a change in the obtuse-angle corner structure or the right-angle corner structure may be accompanied, which will be described with reference to FIGS. 25 to 26.

Referring to FIGS. 1 and 2, the primary barrier 2 forms an accommodating space for accommodating liquefied gas, which is a cryogenic material, and may be made of a metal material. For example, the metal material may be a stainless steel material, but is not limited thereto. The primary barrier 2 may prevent leakage of liquefied gas to the outside together with the secondary barrier 4.

The primary barrier 2 may be fixedly coupled to the upper portion of the primary insulating wall 3 by an anchor strip (not shown), and may be installed so as to be in direct contact with liquefied gas, which is a cryogenic material stored in the liquefied gas storage tank 1.

Referring to FIG. 3, the primary barrier 2 may be divided into a flat portion 21 in contact with the upper surface of the primary insulating wall 3, a curved portion 22 for relieving contraction or expansion stress due to temperature, and a boundary portion 23 between the flat portion 21 and the curved portion 22. For example, it may be formed of a corrugation membrane sheet made of a stainless steel material having a thickness of 1.0 to 1.5 mm, preferably a stainless steel material having a thickness of 1.0 to 1.2 mm. In other words, the primary barrier may be formed in a wrinkle shape.

The primary barrier 2 may be formed so that the wrinkle shape has a first curvature radius R1 and a second curvature radius R2. In other words, the primary barrier 2 of this embodiment may be formed to have two types of curvature radii R1 and R2, wherein the boundary portion 23 between the flat portion 21 and the curved portion 22 forms the first curvature radius R1, and the curved portion 22 forms the second curvature radius R2. For example, the first curvature radius R1 may be smaller than the second curvature radius R2. The primary barrier 2 having a radius of curvature R1, R2 is easy to inspect for welding because the upper portion forms a gentle curve, and also flexibly responds to sloshing because the fluid hitting from the side flows directly. In this regard, it will be described in more detail with reference to FIGS. 32 to 39.

In addition, the primary barrier 2 of this embodiment may be formed to have the same horizontal and vertical wrinkle sizes in the entire region without distinction between large corrugation and small corrugation. In other words, since the horizontal and vertical wrinkle sizes are the same throughout the primary barrier 2, the primary barrier may be easily manufactured.

Referring to FIG. 1, the primary insulating wall 3 is designed to withstand an impact from the outside or an impact caused by liquefied gas sloshing from the inside while blocking heat intrusion from the outside, and may be installed between the primary barrier 2 and the secondary barrier 4.

The primary insulating wall 3 may have a structure in which the primary plywood 31 and the primary insulating material 32 are sequentially stacked to the outside of the primary barrier 2, and may correspond to the sum of the thickness of the primary plywood 31 and the thickness of the primary insulating material 32. The primary insulating wall 3 may be formed to a thickness of 160 mm to 250 mm.

The primary plywood 31 may be installed between the primary barrier 2 and the primary insulating material 32.

The primary plywood 31 may be formed to a thickness of 6.5 mm to 15 mm.

The primary insulating material 32 may be formed of a material having excellent thermal insulating performance and excellent mechanical strength so as to withstand an impact from the outside or an impact caused by liquefied gas sloshing from the inside while blocking heat intrusion from the outside.

The primary insulating material 32 may be formed of polyurethane foam between the primary plywood 31 and the secondary barrier 4, and may correspond to a thickness range of 150 mm to 240 mm.

Referring to FIG. 1, a part of the primary insulating wall 3, the secondary barrier 4 and the secondary insulating wall 5 may be stacked to form a unit element. Here, a part of the primary insulating wall 3 constituting the unit element may be defined as a fixed insulating wall 3*b*, and the width may be smaller than the width of the secondary insulating wall 5 included in the unit element. In addition, the fixed insulating wall 3*b*, the secondary barrier 4 and the secondary insulating wall 5 may be disposed in a pre-fixed state, but is not limited thereto, and each may be separately disposed in the liquefied gas storage tank 1. Accordingly, a portion of the secondary barrier 4 may be exposed on both sides of the primary insulating wall 3. The unit elements may be disposed adjacent to each other, and in this case, a connection insulating wall 3*a* may be installed in a space portion between the adjacent primary insulating walls 3, i.e., in a space portion where the secondary barrier 4 is exposed.

The secondary barrier 4 may be divided into a main barrier 41 and an auxiliary barrier 42, the main barrier 41 is installed on the top of the secondary insulating wall 5 in the unit element, and the auxiliary barrier 42 is installed between the exposed main barrier 41 and the connection insulating wall 3*a*. Here, the auxiliary barrier 42 is provided to interconnect the main barriers 41 provided in the unit elements adjacent to each other. In other words, adjacent unit elements may be closed by the auxiliary barrier 42 and the connection insulating wall 3*a* stacked on the main barrier 41.

The stacked structure of the portion where the connection insulating wall 3*a* is provided is described with reference to FIG. 2. The connection insulating wall 3*a* may be provided in a form in which the connection plywood 31*a* and the connection insulating material 32*a* identical or similar to those described in the primary insulating wall 3 constituting the unit element are stacked, and note that in the present specification, the primary insulating wall 3 may encompass the connection insulating wall 3*a* and the fixed insulating wall 3*b*.

FIG. 2 shows the cross-sectional structure of the plane A-A' of FIG. 1, and the connection insulating wall 3*a* may have a structure in which the connection plywood 31*a* and the connection insulating material 32*a* are stacked. The thickness of the connection insulating wall 3*a* may correspond to the sum of the thickness of the connection plywood 31*a* and the thickness of the connection insulating material 32*a*.

The connection plywood 31*a* may be formed to a thickness of 6.5 mm to 15 mm.

The connection insulating material 32*a* may be formed of polyurethane foam between the connection plywood 31*a* and the secondary barrier 42 of the secondary barrier 4, and may correspond to a thickness range of 150 mm to 240 mm.

As described above, the primary insulating material 32 of the primary insulating wall 3 and the connection insulating material 32*a* of the connection insulating wall 3*a* may have the same thickness. However, in the case of the connection insulating material 32*a* of the connection insulating wall 3*a*, since the auxiliary barrier 42 is further stacked in addition to the main barrier 41 of the secondary barrier 4 at the bottom, the connection insulating material 32*a* of the connection insulating wall 3*a* may be smaller than the thickness of the primary insulating material 32 of the primary insulating wall 3 by the thickness of the auxiliary barrier 42.

When unit elements are disposed adjacent to each other, the above-described connection insulating wall 3*a* is installed to block heat intrusion from the outside while sealing the space portion generated between the adjacent secondary insulating walls 5 together with the auxiliary barrier 42.

However, since the connection insulating wall 3*a* has a structure inserted between the adjacent fixed insulating walls 3*b* constituting the unit element, it is inevitably weak in protecting the secondary barrier 4 at the lower portion of the connection insulating wall 3*a* from cryogenic temperatures. Accordingly, there is a high possibility that a problem occurs in the secondary barrier 4 at the lower portion of the connection insulating wall 3*a* where the main barrier 41 and the auxiliary barrier 42 overlap. Hereinafter, the connection insulating wall 3*a* will be mainly described.

The secondary barrier 4 may be installed between the primary insulating wall 3 and the secondary insulating wall 5 covering the insulating wall 3*a*, and may prevent the leakage of liquefied gas to the outside together with the primary barrier 2.

The secondary barrier 4 at the lower end of the fixed insulating wall 3*b* includes the main barrier 41 as a single barrier, and the secondary barrier 4 at the lower end of the connection insulating wall 3*a* may include a main barrier 41 connecting unit elements to each other and an auxiliary barrier 42 provided on the secondary insulating wall 5 constituting the unit element.

The main barrier 41 is provided on the secondary insulating wall 5 constituting the unit element and may be formed to a thickness of 0.6 mm to 1.0 mm, and the main barriers 41 adjacent to each other may achieve airtightness while the auxiliary barriers 42 are stacked.

The auxiliary barrier 42 may be formed to a thickness of 0.6 mm to 1.0 mm as a configuration for connecting unit elements to each other and may be stacked on the main barrier 41.

On the other hand, referring to FIGS. 1 and 2, the secondary insulating wall 5 may be designed to withstand an impact from the outside or an impact caused by liquefied gas sloshing from the inside while blocking heat intrusion from the outside together with the fixed insulating wall 3*b* and the connection insulating wall 3*a*. In addition, the secondary insulating wall 5 may be installed between the secondary barrier 4 and the hull 7, and may include a secondary insulating material 51 and a secondary plywood 52.

The secondary insulating wall 5 may have a structure in which the secondary insulating material 51 and the secondary plywood 52 are sequentially stacked to the outside of the secondary barrier 4, and the total thickness of the sum of the thickness of the secondary insulating material 51 and the thickness of the secondary plywood 52 may be formed in a range of 150 mm to 240 mm.

The secondary insulating material 51 may be formed of a material having excellent thermal insulating performance and excellent mechanical strength so as to withstand an impact from the outside or an impact caused by liquefied gas sloshing from the inside while blocking heat intrusion from the outside.

The secondary insulating material 51 may be formed of polyurethane foam between the secondary barrier 4 and the secondary plywood 52, and may be formed to a thickness of 140 mm to 230 mm.

The secondary plywood 52 may be installed between the secondary insulating material 51 and the hull 7. For example, in addition, the secondary insulating material 51 may be installed in contact with the secondary plywood 52. The secondary plywood 52 may be formed to a thickness of 6.5 mm to 25 mm.

As described above, the liquefied gas storage tank 1 according to this embodiment 1 may be configured such that the connection insulating wall 3*a* has the same or similar thickness as the secondary insulating wall 5, by letting the primary insulating wall 3 have a thickness of 66% to 166% of the secondary insulating wall 5, and the connection insulating wall 3*a* encompassed by the primary insulating wall 3 have a thickness of 67% to 167% of the secondary insulating wall 5. To be associated with this configuration, the connection insulating material 32*a* of the connection insulating wall 3*a* has a thickness of 90% to 110% of the secondary insulating material 51, so that the connection insulating material 32*a* of the connection insulating wall 3*a* may be configured to have the same or similar thickness as the secondary insulating material 51. In this embodiment, although the portion of the fixed insulating wall 3*b* constituting a unit element while encompassing the connection insulating wall 3*a* is not mentioned in detail, the fixed insulating wall 3*b* is also the same as or similar to the connection insulating wall 3*a* in relation to the secondary insulating wall 5.

When the connection insulating wall 3*a* and the secondary insulating wall 5 or the connection insulating material 32*a* of the connection insulating wall 3*a* and the secondary insulating material 51 are formed in this thickness ratio, the upper limit of stress at a low temperature of the secondary barrier 4 may correspond to 50 MPa or less in the lower portion of the connection insulating wall 3*a*. In addition, specifically, the stress value at a low temperature of the secondary barrier 4 may be 40 MPa to 50 MPa in the lower portion of the connection insulating wall 3*a*. These figures were obtained according to the results of structural analysis to be described later.

In this embodiment, the thickness of the connection insulating wall 3*a* and the secondary insulating wall 5 or the connection insulating material 32*a* of the primary insulating wall 3 and the secondary insulating material 51 were configured to have the same or similar thickness, and in this regard, it will be described with reference to FIGS. 4 to 20.

Figure 4A:
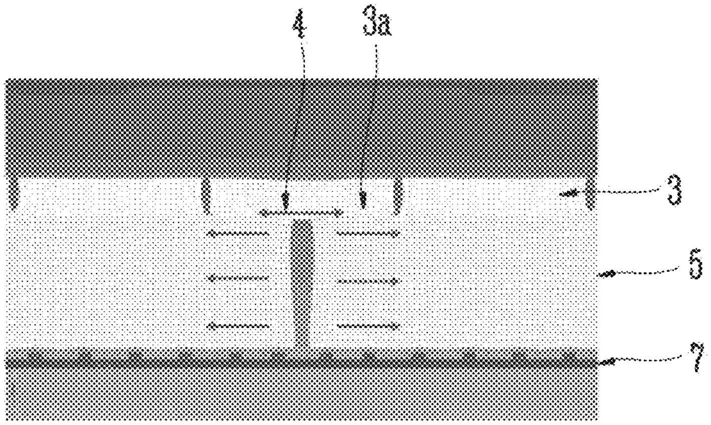
FIGS. 4A and 4B are diagrams illustrating a tensile force of a secondary barrier according to a thickness change of a primary insulating wall and a secondary insulating wall.
Figure 4B:
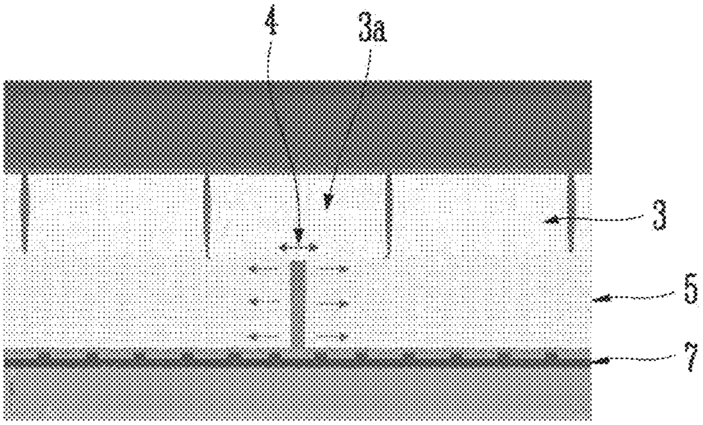

FIGS. 4A and 4B are diagrams illustrating the tensile force of the secondary barrier 4 at the lower portion of the connection insulating wall 3*a* according to the thickness change of the connection insulating wall 3*a* encompassed by the primary insulating wall 3 and the secondary insulating wall 5. It is assumed that the total thickness of the connection insulating wall 3*a*, the secondary barrier 4, the secondary insulating wall 5 and the like in FIGS. 4A and 4B is the same.

On the other hand, the secondary barrier 4 and the secondary insulating wall 5 have a difference in the amount of self-contraction depending on the temperature to which they are exposed, and in the case of the secondary barrier 4 and the secondary insulating wall 5, as the thickness of the connection insulating wall 3*a* decreases, it may be greatly affected by the cold heat of cryogenic liquefied gas. In addition, in this case, because the self temperature is lowered, the amount of contraction itself increases, stress at low temperature increases, and there is a problem that the risk of damage to the secondary barrier 4 increases. Such a problem may occur particularly in the auxiliary barrier 42 that interconnects the main barrier 41 provided in unit elements adjacent to each other under the connection insulating wall 3*a* by bonding or the like. Both ends of the auxiliary barrier 42 in the lower portion of the connection insulating wall 3*a* are connected to the main barrier 41 of each unit element, which is because, as the secondary insulating wall 5 of the unit element contracts, both ends of the auxiliary barrier 42 may be deformed to move away from or close to each other.

Referring to FIG. 4A, the connection insulating wall 3*a* is formed to be relatively thinner than the secondary insulating wall 5, and thus the height of the secondary barrier 4 is located above the center of the total thickness based on the thickness direction. Here, in order to reduce the mechanical stress applied to the secondary barrier 4 when the hull is structurally deformed due to the 6 degree of freedom movement of the hull 7, as the thickness of the secondary insulating wall 5 is secured, the thickness of the secondary insulating wall 5 may be relatively increased compared to the connection insulating wall 3*a*.

Referring to FIG. 4B, the thickness of the connection insulating wall 3*a* and the secondary insulating wall 5 are similarly formed, and the height of the secondary barrier 4 is located in the central region of the total thickness based on the thickness direction. Here, the central region may correspond to 40% to 60% of the total thickness. In this case, as compared with FIG. 4A, the amount of contraction itself is reduced, and thus the stress at low temperature will be reduced. In addition, compared with FIG. 4A, the risk of damage to the secondary barrier will be relatively low.

In the present disclosure, a liquefied gas storage tank 1 that may reduce the low temperature burden and sloshing burden of the secondary barrier 4 while maintaining the mechanical strength of the secondary insulating wall 5 at a certain level was derived, and this will be understood by the following description with reference to FIGS. 5 to 20.

FIGS. 5 to 20 are, diagrams showing the results of structural analysis performed while varying the thickness of the connection insulating wall 3*a* and the secondary insulating wall 5 for each Case 1 (FIGS. 5 to 8), Case 2 (FIGS. 9 to 12), Case 3 (FIGS. 13 to 16), and Case 4 (FIGS. 17 to 20), in order to derive the thickness of the primary insulating wall 3 encompassing the connection insulating wall 3*a* and the secondary insulating wall 5 of the liquefied gas storage tank 1 according to the present embodiment described above. In this embodiment, the thickness of the connection insulating wall 3*a* is mainly described, but it should be noted that the thickness of the primary insulating wall 3 is also the same as or similar to that of the connection insulating wall 3*a*.

In carrying out the structural analysis for each case, the analysis conditions are as follows.

First, the total thickness of the connection insulating wall 3*a* and the secondary insulating wall 5 of Case 1 to Case 4, which are the analysis models, was equally applied to 400 mm.

Second, only the location of the secondary barrier 4 was different by varying the thickness of each of the connection insulating wall 3*a* and the secondary insulating wall 5.

Third, in consideration of the same linear temperature distribution conditions, the temperature of the primary barrier 2 position was set to −163° C., which is the temperature of the liquefied gas, and the temperature at the hull 7 position was set to room temperature 20° C.

Fourth, the thickness ratio was taken as the ratio of the thickness of the connection insulating wall 3*a* out of the total thickness 400 mm.

Structural analysis of Case 1 to Case 4, which is an analysis model, was performed under the above analysis conditions.

FIGS. 5 to 8 are drawings showing the results of structural analysis while varying the thickness of the connection insulating wall 3*a* and the secondary insulating wall 5 of Case 1, for deriving the thickness of the connection insulating wall 3*a* encompassed in the primary insulating wall 3 and the secondary insulating wall 5 of the liquefied gas storage tank according to the first embodiment of the present disclosure.

Figure 5:
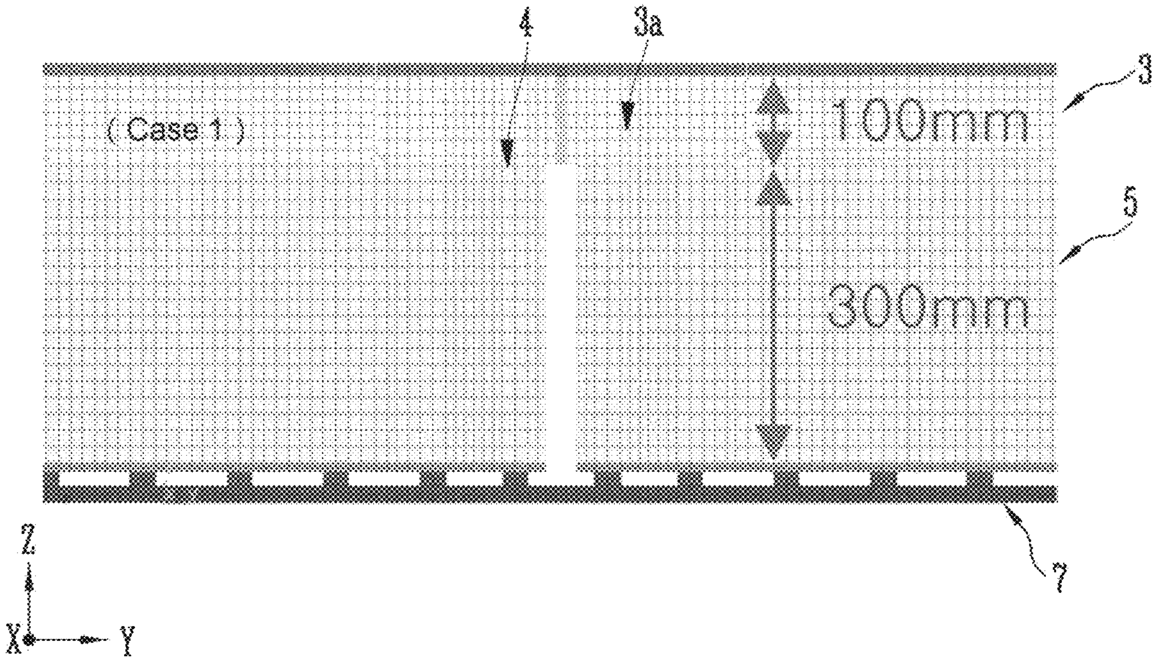
FIGS. 5 to 8 are diagrams illustrating the results of structural analysis while varying a thickness of a primary insulating wall and a secondary insulating wall of Case 1 in order to derive thicknesses of the primary insulating wall and the secondary insulating wall of the liquefied gas storage tank in accordance with the first embodiment of the present disclosure.

Case 1 is a case in which the thickness of the connection insulating wall 3*a* is 100 mm and the thickness of the secondary insulating wall 5 is 300 mm, as shown in FIG. 5. In other words, in Case 1, the ratio of the thickness of the connection insulating wall 3*a* among the total thickness 400 mm of the connection insulating wall 3*a* and the secondary insulating wall 5 is 0.25, and the secondary barrier 4 is located close to the primary barrier 2, which is an upper end from the center of the total thickness of the connection insulating wall 3*a* and the secondary insulating wall 5.

Figure 6:
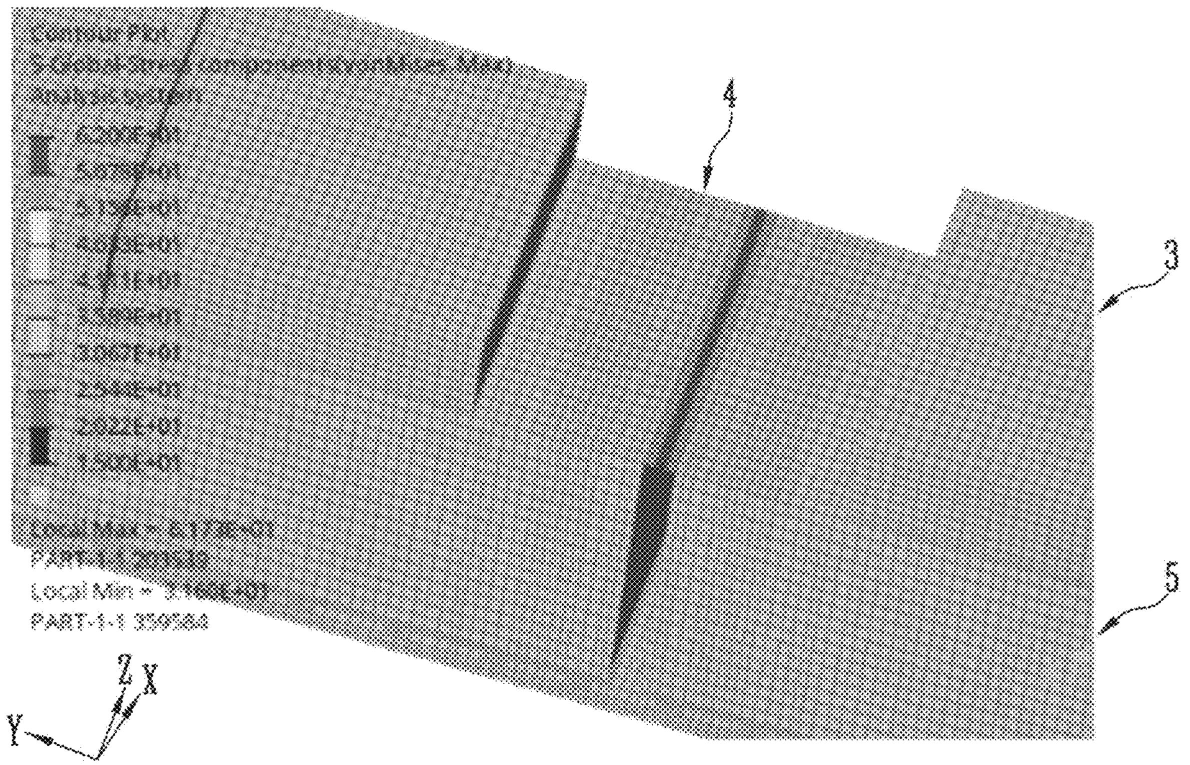
Figure 7:
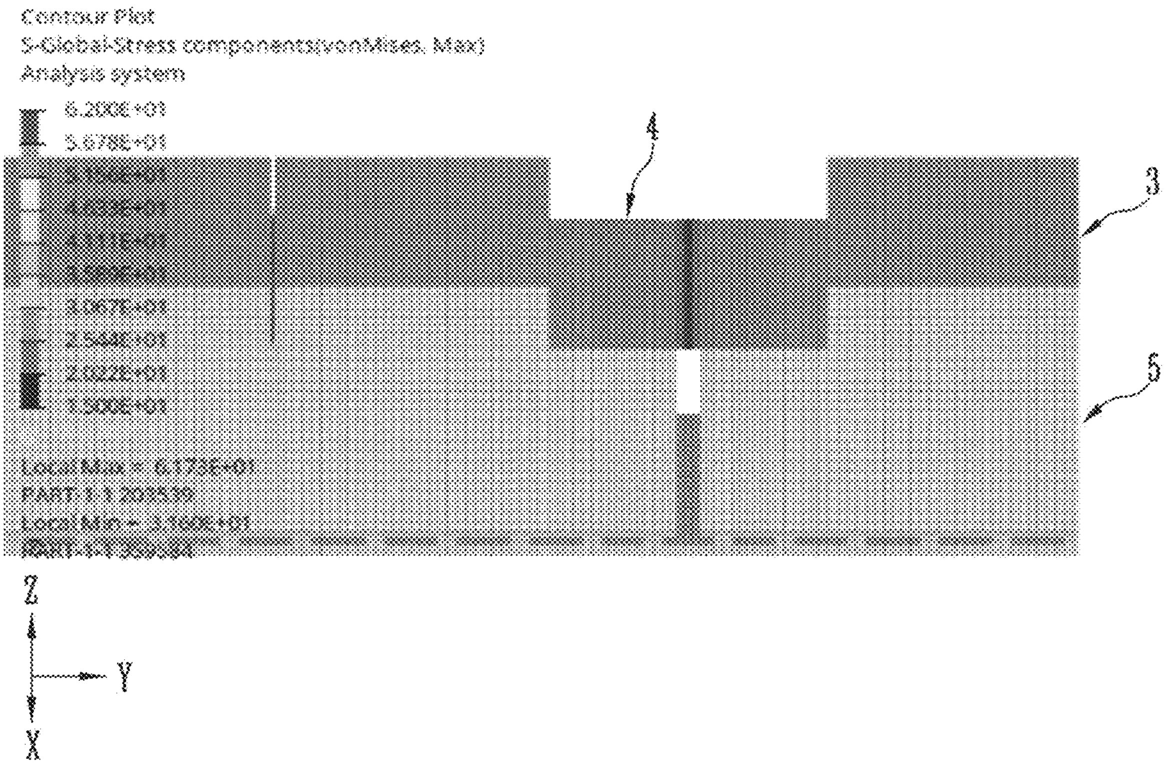
Figure 8:
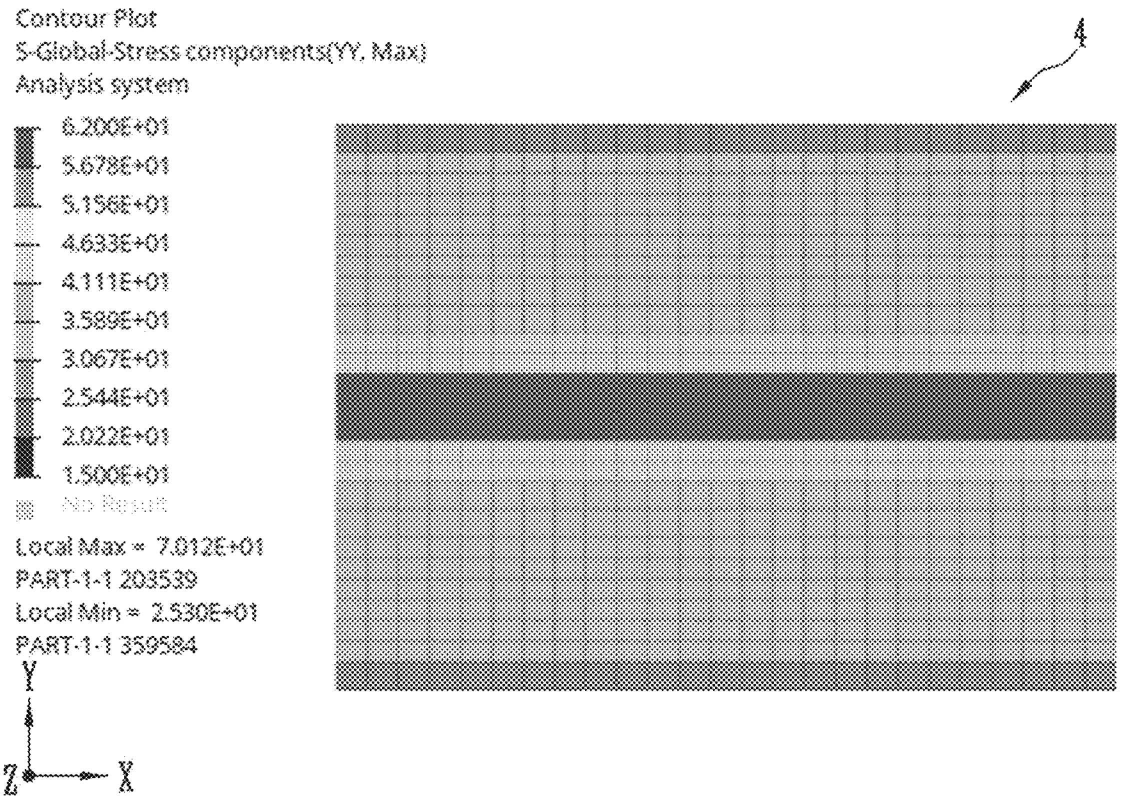

In this Case 1, as shown in FIGS. 6 to 8, as a result of the structural analysis, the stress value of the secondary barrier 4 in correspondence between the adjacent secondary insulating walls 5 was calculated to be 70.12 MPa in a state in which the unit elements were disposed adjacent to each other.

The reason why stress is generated in the secondary barrier 4 in the case of Case 1 may be seen from FIG. 4. In other words, as the thickness of the connection insulating wall 3*a* decreases, it is greatly affected by the cold heat of the liquefied gas in the secondary barrier 4.

FIGS. 9 to 12 are diagrams showing the results of structural analysis while varying the thicknesses of the connection insulating wall 3*a* and the secondary insulating wall 5 of Case 2 conducted to derive the thickness of the connection insulating wall 3*a* encompassed by the primary insulating wall 3 and the secondary insulating wall 5 of the liquefied gas storage tank according to the first embodiment of the present disclosure.

Figure 9:
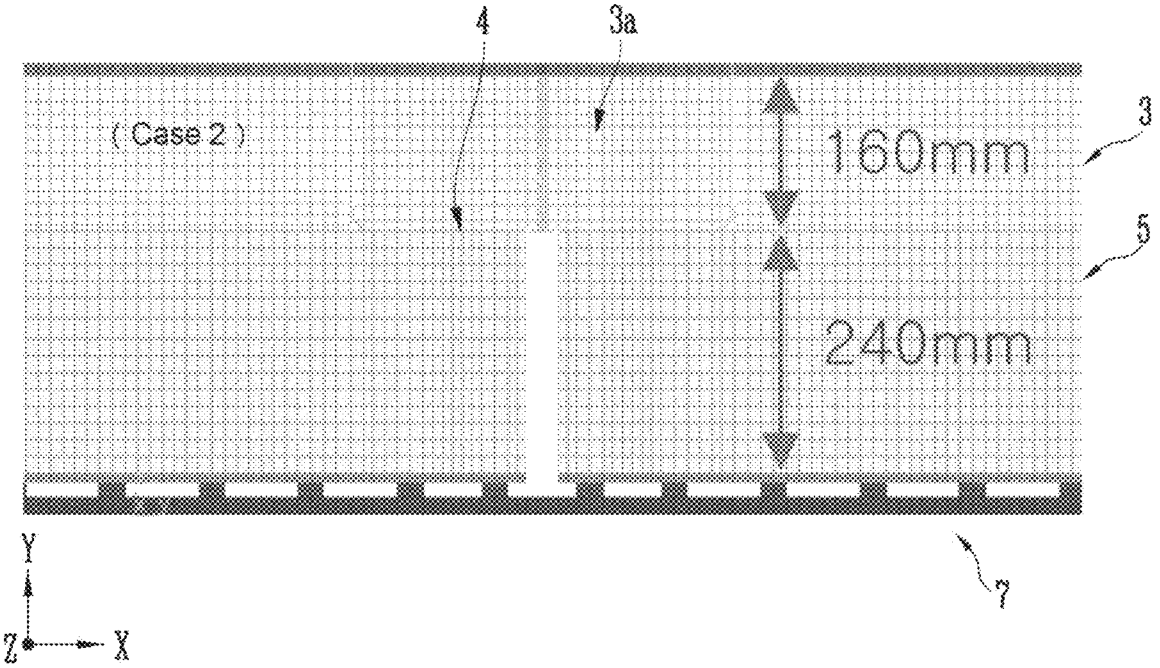
FIGS. 9 to 12 are diagrams illustrating the results of structural analysis while varying thicknesses of a primary insulating wall and a secondary insulating wall of Case 2, which were carried out to derive the thicknesses of the primary insulating wall and the secondary insulating wall of the liquefied gas storage tank in accordance with the first embodiment of the present disclosure.

Case 2 is a case in which the thickness of the connection insulating wall 3*a* is 160 mm and the thickness of the secondary insulating wall 5 is 240 mm, as shown in FIG. 9. In other words, in Case 2, the ratio of the thickness of the connection insulating wall 3*a* among the total thickness 400 mm of the connection insulating wall 3*a* and the secondary insulating wall 5 is 0.4, and the secondary barrier 4 is located slightly biased toward the primary barrier 2 from the center of the total thickness of the sum of the thicknesses of the connection insulating wall 3*a* and the secondary insulating wall 5.

Figure 10:
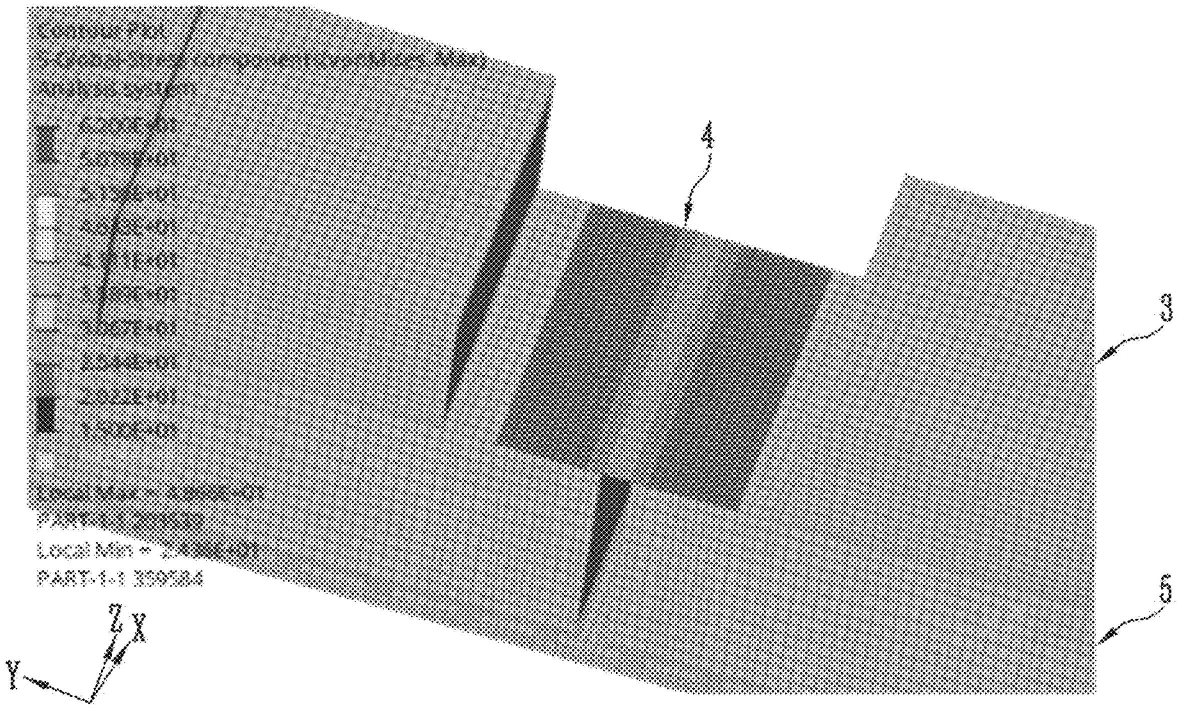
Figure 11:
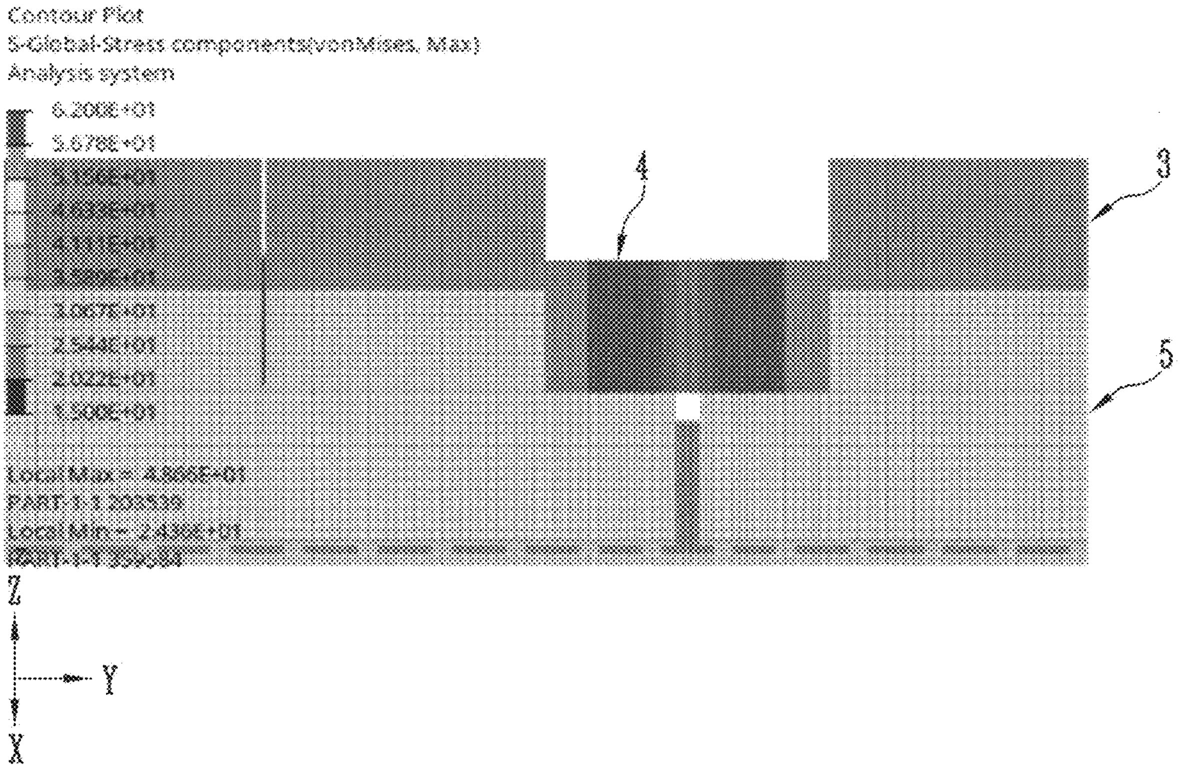
Figure 12:
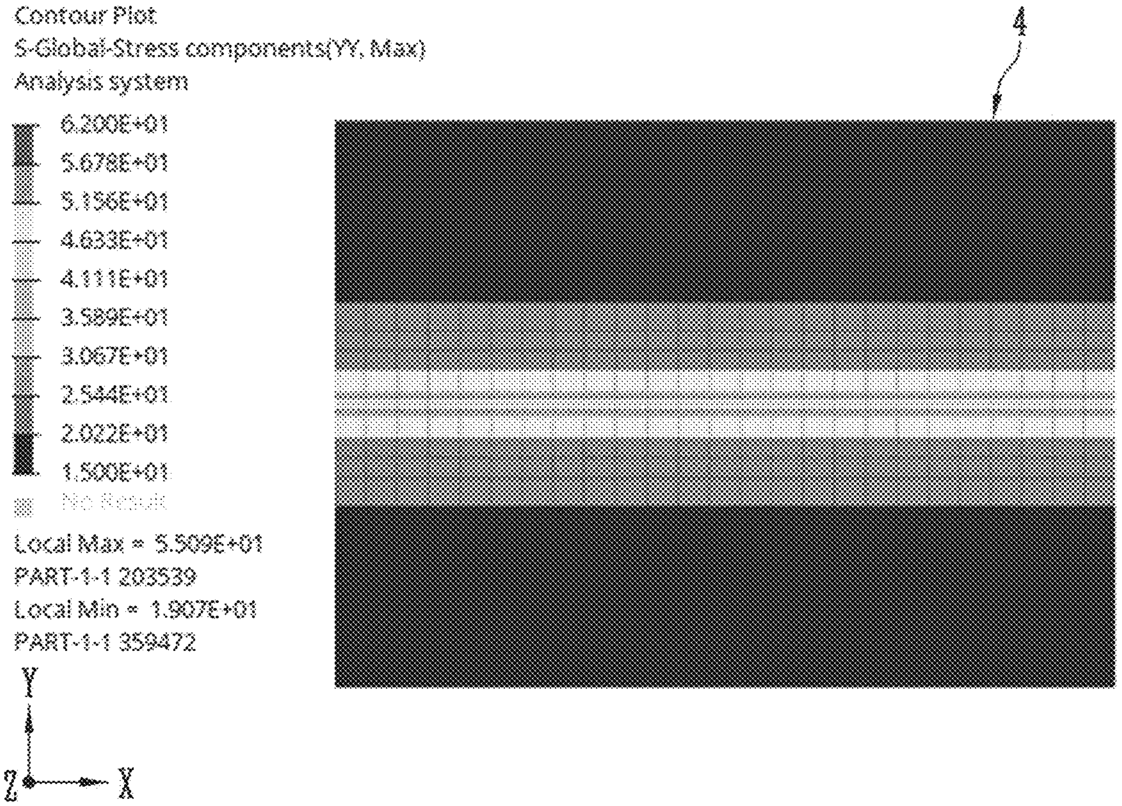

In this Case 2, as shown in FIGS. 10 to 12, as a result of the structural analysis, the stress value of the secondary barrier 4 in correspondence between the adjacent secondary insulating walls 5 was calculated to be 55.09 MPa in a state in which the unit elements were disposed adjacent to each other.

FIGS. 13 to 16 are diagrams showing the results of structural analysis while varying the thicknesses of the connection insulating wall 3*a* and the secondary insulating wall 5 of Case 3 conducted to derive the thickness of the connection insulating wall 3*a* encompassed by the primary insulating wall 3 and the secondary insulating wall 5 of the liquefied gas storage tank according to the first embodiment of the present disclosure.

Figure 13:
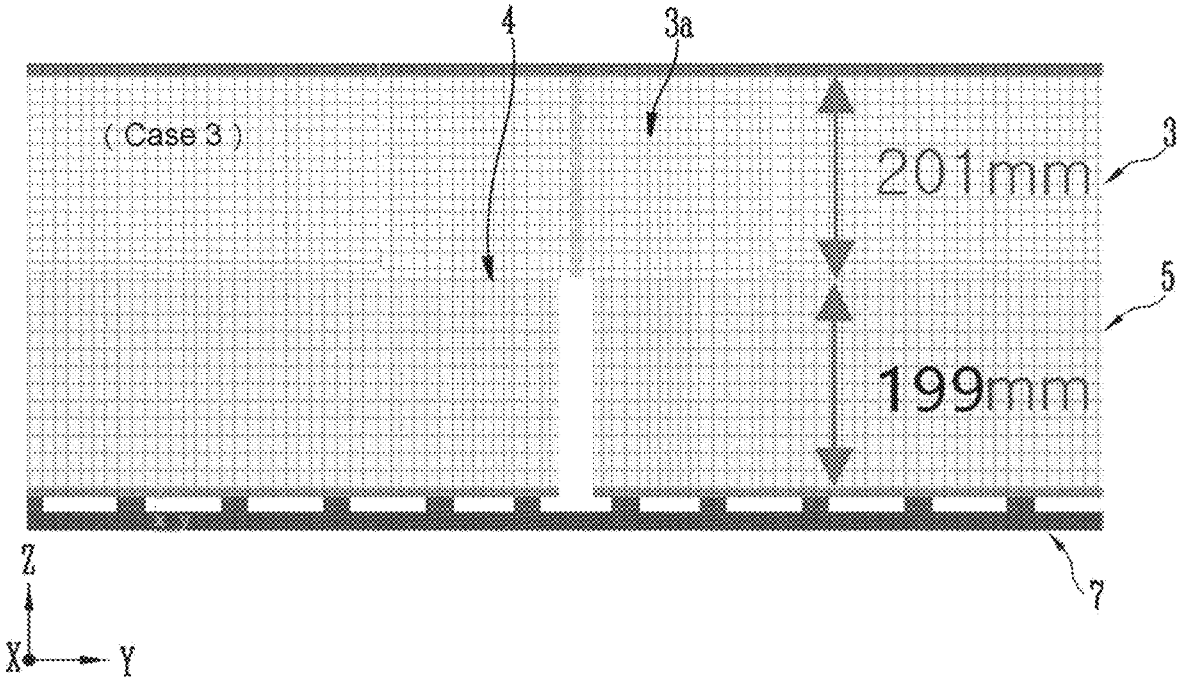
FIGS. 13 to 16 are diagrams illustrating the results of structural analysis while varying thicknesses of a primary insulating wall and a secondary insulating wall of Case 3, which were carried out to derive the thicknesses of the primary insulating wall and the secondary insulating wall of the liquefied gas storage tank in accordance with the first embodiment of the present disclosure.

Case 3 is a case in which the thickness of the connection insulating wall 3*a* and the thickness of the secondary insulating wall 5 are identical or similar as shown in FIG. 13. In other words, in Case 3, the ratio of the thickness of the connection insulating wall 3*a* among the total thickness 400 mm of the connection insulating wall 3*a* and the secondary insulating wall 5 is about 0.5, and the secondary barrier 4 is located adjacent to the center of the total thickness of the sum of the thicknesses of the connection insulating wall 3*a* and the secondary insulating wall 5.

Figure 14:
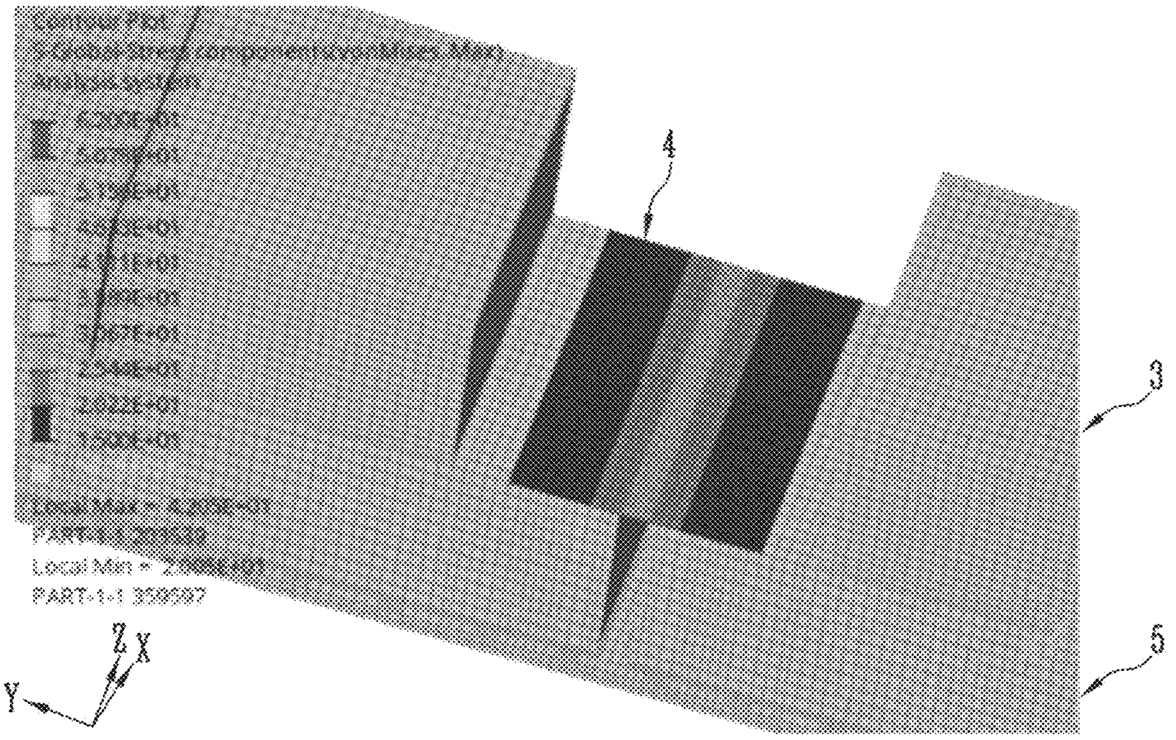
Figure 15:
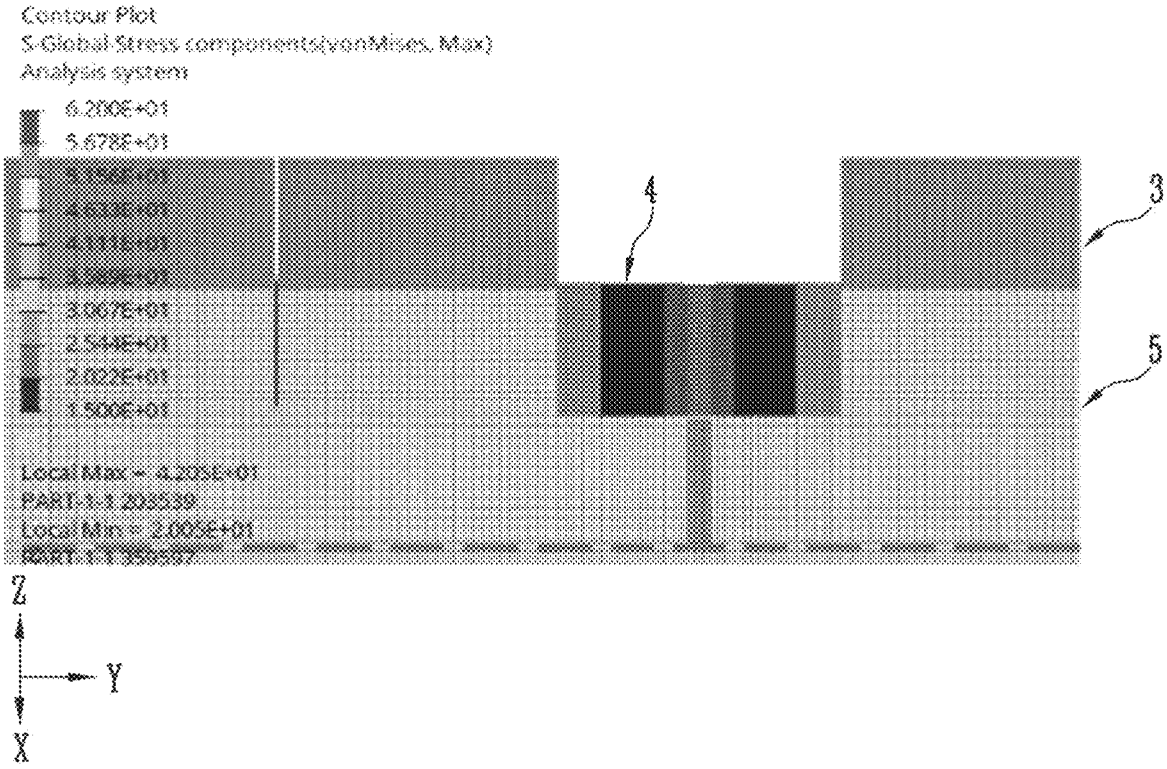
Figure 16:
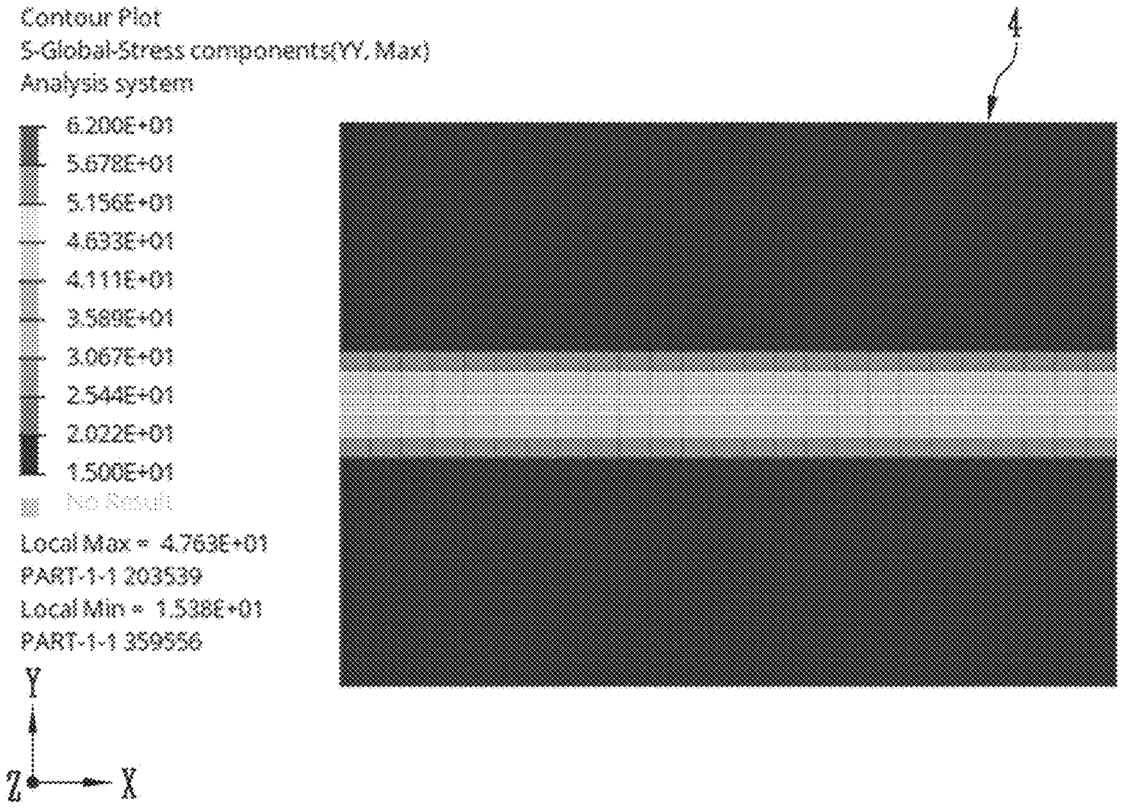

In this Case 3, as shown in FIGS. 14 to 16, as a result of the structural analysis, the stress value of the secondary barrier 4 in correspondence between the adjacent secondary insulating walls 5 was calculated to be 47.63 MPa in a state in which the unit elements were disposed adjacent to each other.

FIGS. 17 to 20 are diagrams showing the results of structural analysis while varying the thicknesses of the connection insulating wall 3*a* and the secondary insulating wall 5 of Case 4 conducted to derive the thickness of the connection insulating wall 3*a* encompassed by the primary insulating wall 3 and the secondary insulating wall 5 of the liquefied gas storage tank according to the first embodiment of the present disclosure.

Figure 17:
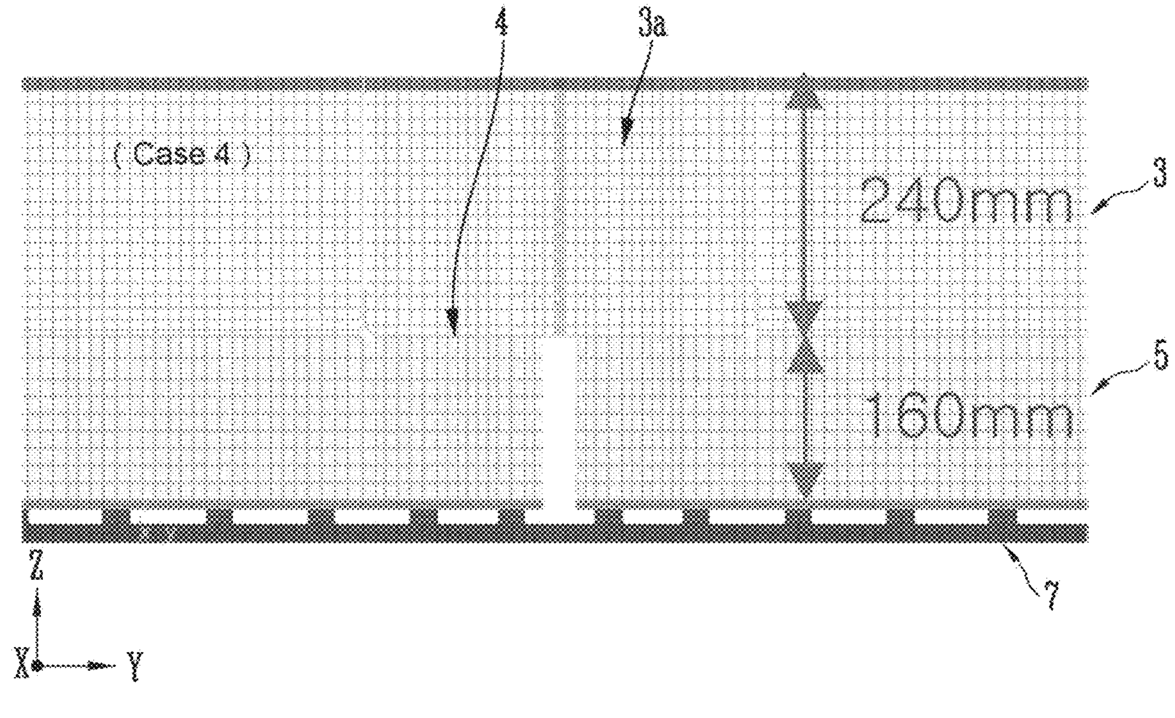
FIGS. 17 to 20 are diagrams illustrating the results of structural analysis while varying thicknesses of a primary insulating wall and a secondary insulating wall of Case 4, which were carried out to derive the thicknesses of the primary insulating wall and the secondary insulating wall of the liquefied gas storage tank in accordance with the first embodiment of the present disclosure.

Case 4 is a case in which the thickness of the connection insulating wall 3*a* is 240 mm and the thickness of the secondary insulating wall 5 is 160 mm, as shown in FIG. 17. In other words, in Case 4, the ratio of the thickness of the connection insulating wall 3*a* among the total thickness 400 mm of the connection insulating wall 3*a* and the secondary insulating wall 5 is 0.6, and the secondary barrier 4 is located below the center of the total thickness of the sum of the thicknesses of the connection insulating wall 3*a* and the secondary insulating wall 5.

Figure 18:
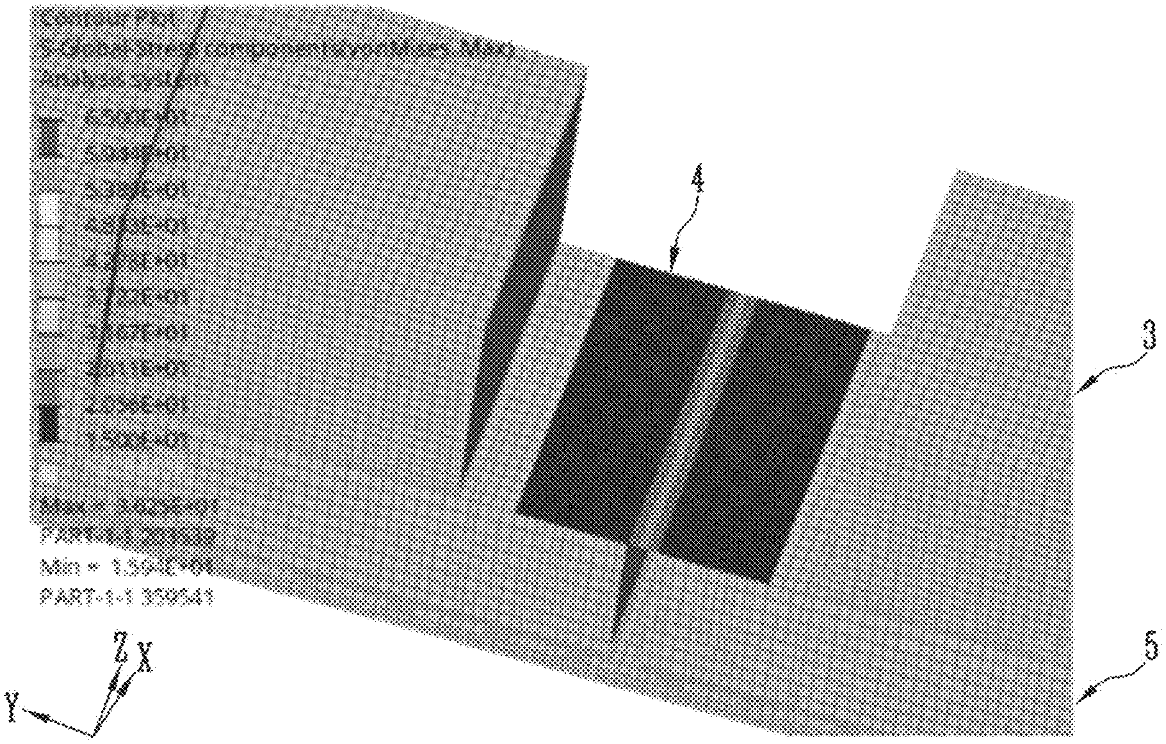
Figure 19:
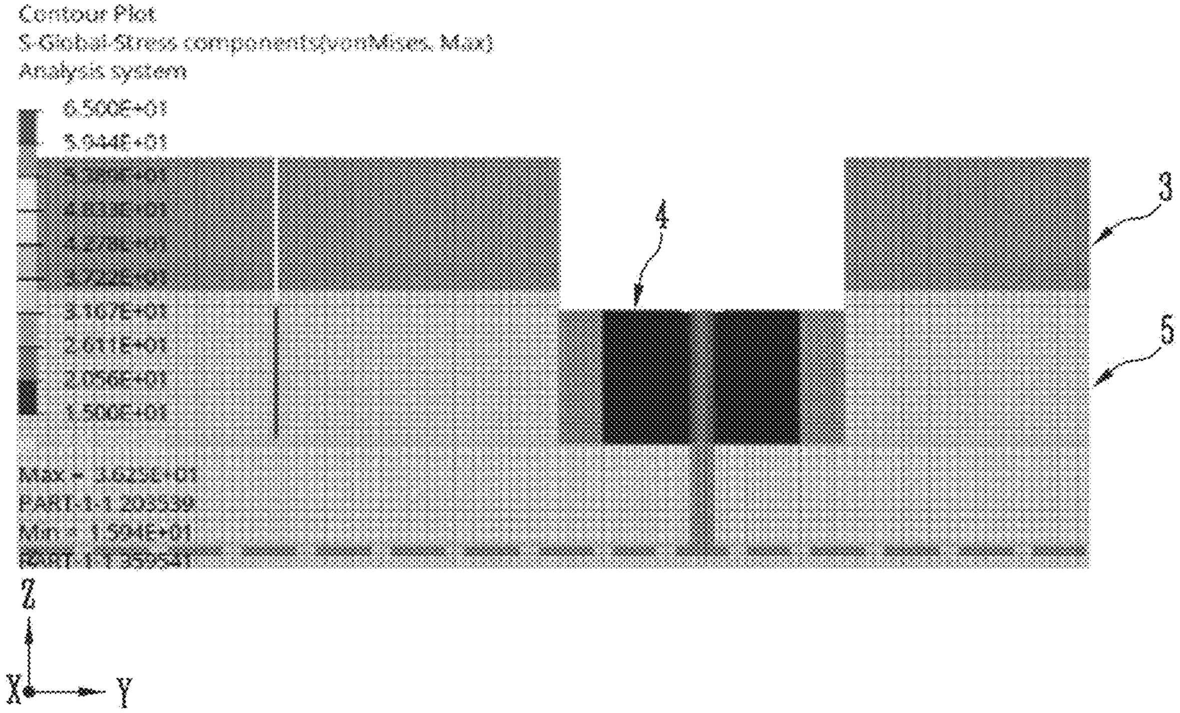
Figure 20:
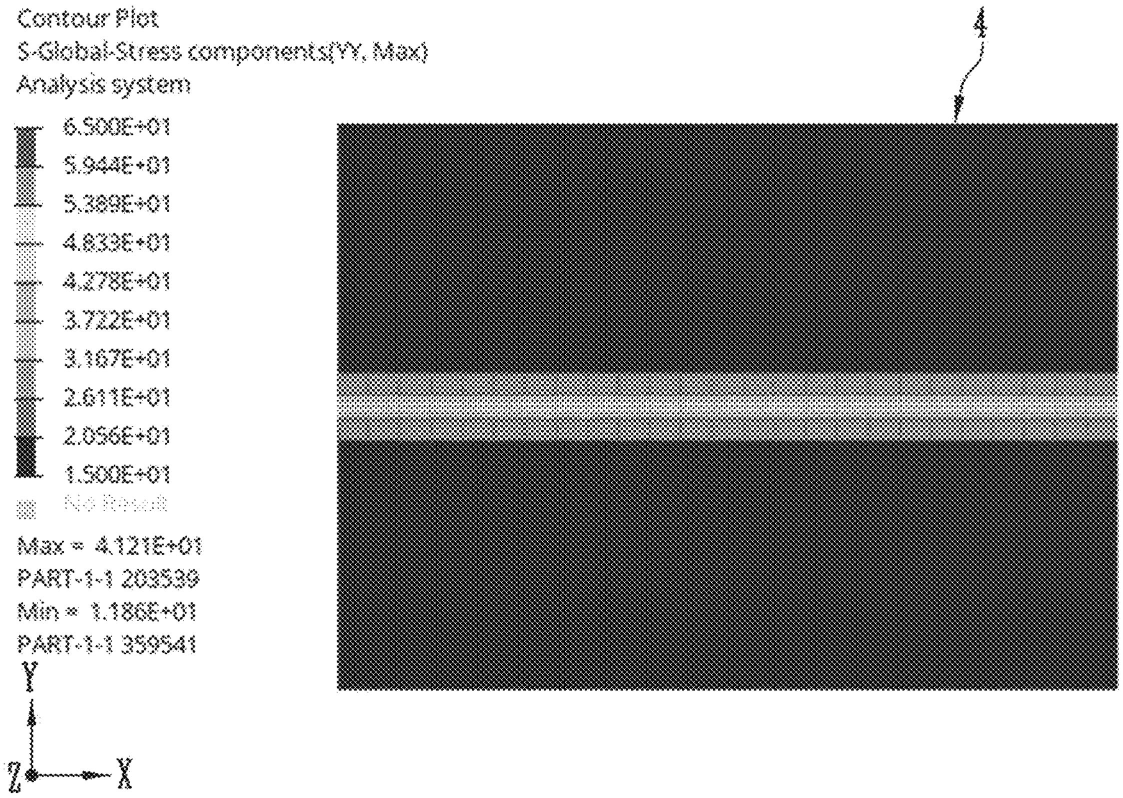

In this Case 4, as shown in FIGS. 18 to 20, as a result of the structural analysis, the stress value of the secondary barrier 4 in correspondence between the adjacent secondary insulating walls 5 was calculated to be 41.21 MPa in a state in which the unit elements were disposed adjacent to each other.

As described above, as a result of structural analysis of each Case 1 to 4, it was found that the secondary barrier 4 at the lower portion of the connection insulating wall 3*a* showed a tendency to decrease in low-temperature stress due to thermal contraction as the distance from the primary barrier 2 increased. It will be described with reference to FIG. 21.

Figure 21:
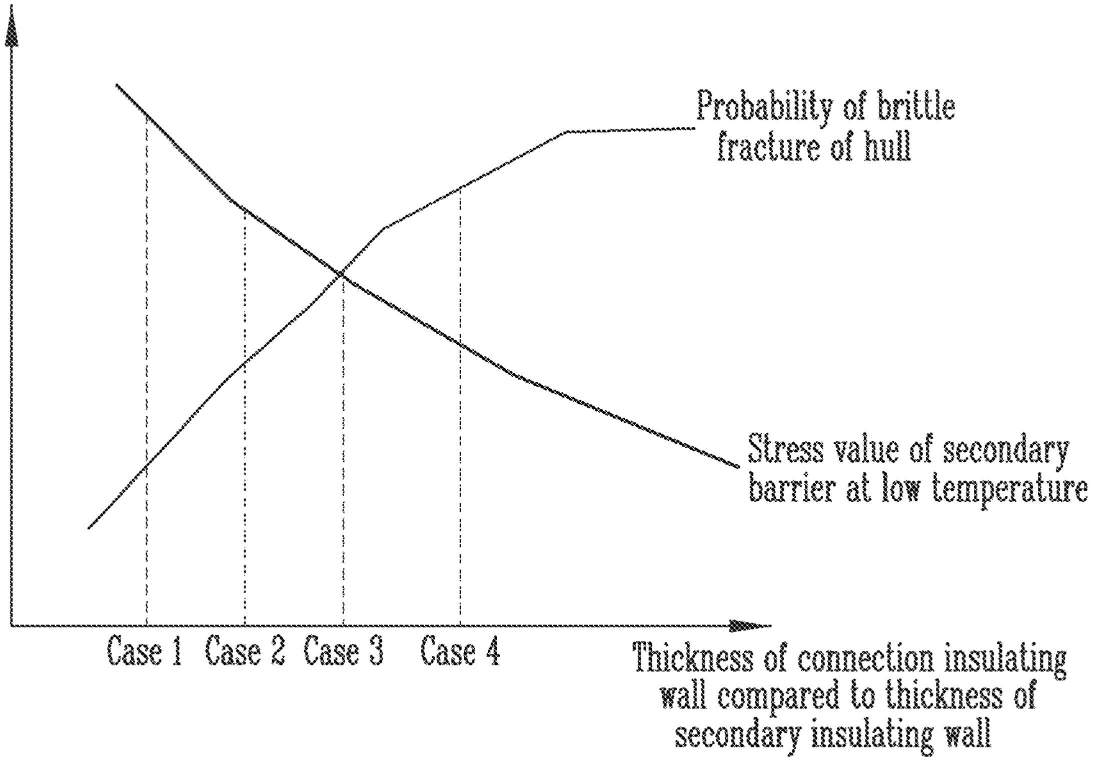
FIG. 21 is a graph illustrating a low-temperature stress of a secondary barrier and a probability of brittle fracture of a hull according to a thickness change of a primary insulating wall and a secondary insulating wall.

FIG. 21 is a graph illustrating a low-temperature stress of a secondary barrier and a probability of brittle fracture of a hull according to a thickness change of a primary insulating wall and a secondary insulating wall.

As the graph shown in FIG. 21, in addition to Case 1 to Case 4, as the secondary barrier 4 at the lower portion of the connection insulating wall 3*a* is further away from the primary barrier 2, it may be predicted that the stress value due to thermal contraction at low temperature decreases. In other words, it may be seen that since when the secondary barrier 4 at the lower portion of the connection insulating wall 3*a* is further away from the primary barrier 2, the temperature is relatively high compared to when it is close, the contraction decreases and therefore the stress decreases. In this embodiment, the secondary barrier 4 at the lower portion of the connection insulating wall 3*a* is be mainly described, but it will be apparent that the secondary barrier 4 at the lower portion of the fixed insulating wall 3*b* constituting the unit element also decreases in stress as the distance from the primary barrier 2 increases. The secondary barrier 4 at the lower portion of the connection insulating wall 3*a* is a state in which the main barrier 41 and the auxiliary barrier 42 are stacked, and the secondary barrier 4 at the lower portion of the primary insulating wall 3 consists of only the main barrier 41.

In the liquefied gas storage tank 1 of this embodiment derived in this way, as the thickness of the connection insulating wall 3*a* is increased from the total thickness of the sum of the thicknesses of the connection insulating wall 3*a* and the secondary insulating wall 5, the temperature received by the secondary barrier 4 increases (the influence of cold heat from cryogenic liquid gas decreases). Through this, the contraction due to the cold heat of the secondary barrier 4 itself is reduced, and the stress caused by the cold heat is reduced, so as to prevent damage to the secondary barrier 4 due to the cold heat. This principle is also applied to the secondary barrier 4 at the lower portion of the primary insulating wall 3 defined as encompassing the connection insulating wall 3*a*.

In addition, in the secondary barrier 4, as the thickness of the connection insulating wall 3*a* and the fixed insulating wall 3*b* is increased (the thickness of the secondary insulating wall 5 is relatively decreased), the sloshing load and the fluid dynamic load transmitted to the secondary barrier 4 are lowered, and as the stress caused by the sloshing is decreased, it is possible to prevent damage caused by the sloshing. In addition, as the thickness of the secondary insulating wall 5 becomes thinner (the thickness of the primary insulating wall 3 becomes relatively thick), it can be facilitated to level the flatness of the second barrier 4.

In addition, as the thickness of the connection insulating wall 3*a* and the fixed insulating wall 3*b* increases, the thickness of the secondary insulating wall 5 is relatively decreased, and since it is relatively far from the primary barrier 2, the contractile force due to the cold heat of the secondary insulating wall 5 is also decreased, and as the tensile force of the secondary barrier 4 is decreased according to the decrease in the contractile force of the secondary insulating wall 5, the secondary barrier 4 may be prevented from being damaged by the contractile force of the secondary insulating wall 5.

Considering such low temperature stress of the secondary barrier 4, in the present disclosure, it is possible to dispose the connection insulating wall 3*a* to correspond to 40% or more in the combined thickness of the connection insulating wall 3*a* and the secondary insulating wall 5. Preferably, in the liquefied gas storage tank 1 of the present disclosure, it is possible to dispose the connection insulating wall 3*a* to correspond to the range of Case 2 to Case 4, i.e., 40% to 60% of the combined thickness of the connection insulating wall 3*a* and the secondary insulating wall 5. More preferably, in the liquefied gas storage tank 1 of the present disclosure, it is possible to dispose the connection insulating wall 3*a* to correspond to the range of Case 3, i.e., 47% to 53% of the combined thickness of the connection insulating wall 3*a* and the secondary insulating wall 5.

However, when the thickness of the connection insulating wall 3*a* and the primary insulating wall 3 is increased, the thickness of the secondary insulating wall 5 is relatively decreased, so the secondary insulating wall 5 is inevitably vulnerable to mechanical stress applied when the hull 7 is structurally deformed due to the 6 degree of freedom movement of the hull 7, and accordingly, the degree of mechanical stress transmitted to the secondary barrier 4 through the secondary insulating wall 5 is inevitably increased.

In addition, in the state in which the liquefied gas is loaded, an emergency condition such as the primary barrier 2 being broken may occur. In this case, since the primary barrier 2 may no longer prevent leakage of the liquefied gas, the liquefied gas may come into contact with the secondary barrier 4. In addition, when the secondary barrier 4 is in contact with the cryogenic liquefied gas, the temperature of the hull is lowered, the probability of brittle fracture may be increased. In addition, the lower the temperature, the higher the material strength of the hull, but since the brittleness problem occurs, the probability of brittle fracture may increase. Here, brittle fracture may correspond to a sudden fracture that occurs with little plastic deformation, and may be understood as a brittle crack.

In this regard, referring to FIG. 21, in an emergency situation, the secondary barrier 4 in contact with cryogenic liquefied gas from Case 1 to Case 4 approaches the hull, so the probability of brittle fracture increases. In other words, in FIG. 21, the probability of brittle fracture of the hull increases from Case 1 to Case 4, i.e., as the thickness of the connection insulating wall increases compared to the thickness of the secondary insulating wall 5. In addition, when the thickness of the connection insulating wall 3*a* becomes thicker than Case 4, the probability of brittle fracture is close to 1 and the hull may be cracked or split.

Therefore, the insulating system of the liquefied gas storage tank 1 should be disposed in consideration of the risk of cracking or destruction of the hull as well as the above-described low-temperature stress. In the present disclosure, considering both aspects of low-temperature stress and hull cracking, Case 2 to Case 4 in which the secondary barrier 4 is located in the central region of the total thickness including the thickness of the connection insulating wall 3*a* and the secondary insulating wall 5 may be appropriate. Preferably, it may be seen that Case 3 is appropriate in terms of mechanical aspect of low-temperature stress and hull cracking.

Therefore, in the present disclosure, cases 2 to Case 4 may be used as suitable embodiments, wherein the secondary barrier 4 may reduce the burden on the structural stress transmitted from the hull 7 by properly providing the thickness of the secondary insulating wall 4 to secure the interval between the hull 7 and the secondary barrier 4, while securing the thickness of the connection insulating wall 3*a* and the primary insulating wall 3 to reduce the low-temperature stress of the secondary barrier 4. In addition, Case 3 among them will correspond to a preferred embodiment when both aspects of low-temperature stress and mechanical strength are considered.

Under the structural analysis conditions similar to or identical to those of Case 1 to Case 4, the change in stress in the lower portion of the connection insulating wall 3*a* according to the thickness change of the primary insulating wall 3 and the secondary insulating wall 5 is shown in [Table 1] below. Here, since the connection insulating wall 3*a* may be an insulating wall encompassed by the primary insulating wall 3 as described above, in [Table 1] below, the thickness of the primary insulating wall 3 may be the thickness of the connection insulating wall 3*a*. In addition, the stress change at the lower portion of the connection insulating wall 3*a* may be a stress change of the secondary barrier 4 which is a lower layer of the connection insulating wall 3*a*.

In the following, it should be noted that Examples 1 to 5 and Comparative Examples 1 to 3 described with reference to [Table 1] do not necessarily mean the same example even if the same numerical values as the above-mentioned examples (Case 1 to Case 4) are used.

TABLE 1

| | Primary insulating wall | Secondary insulating wall | Secondary barrier stress value (MPa) |
|---|---|---|---|
| Example 1 | 160 | 240 | 55.09 |
| Example 2 | 180 | 220 | 51.08 |
| Example 3 | 200 | 200 | 47.63 |
| Example 4 | 220 | 180 | 44.13 |
| Example 5 | 240 | 160 | 41.21 |
| Comparative Example 1 | 100 | 300 | 70.12 |
| Comparative Example 2 | 300 | 100 | 34.29 |
| Comparative Example 3 | 140 | 260 | 59.52 |

As shown in Table 1, Example 1 is a case in which the thickness of the primary insulating wall 3 is 160 mm and the thickness of the secondary insulating wall 5 is 240 mm, and in the case of Example 1, as a result of structural analysis, the stress value of the secondary barrier 4 which is the lower layer of the connection insulating wall 3*a* was calculated to be 55.09 MPa.

Example 2 is a case in which the thickness of the primary insulating wall 3 is 180 mm and the thickness of the secondary insulating wall 5 is 220 mm, and in the case of Example 2, as a result of structural analysis, the stress value of the secondary barrier 4 which is the lower layer of the connection insulating wall 3*a* was calculated to be 51.08 MPa.

Example 3 is a case in which the thickness of the primary insulating wall 3 is 200 mm and the thickness of the secondary insulating wall 5 is 200 mm, and in the case of Example 3, as a result of structural analysis, the stress value of the secondary barrier 4 which is the lower layer of the connection insulating wall 3*a* was calculated to be 47.63 MPa.

Example 4 is a case in which the thickness of the primary insulating wall 3 is 220 mm and the thickness of the secondary insulating wall 5 is 180 mm, and in the case of Example 4, as a result of structural analysis, the stress value of the secondary barrier 4, which is the lower layer of the connection insulating wall 3*a* was calculated to be 44.13 MPa.

Example 5 is a case in which the thickness of the primary insulating wall 3 is 240 mm and the thickness of the secondary insulating wall 5 is 160 mm, and in the case of Example 5, as a result of structural analysis, the stress value of the secondary barrier 4, which is the lower layer of the connection insulating wall 3*a* was calculated to be 41.21 MPa.

Comparative Example 1 is a case in which the thickness of the primary insulating wall 3 is 100 mm and the thickness of the secondary insulating wall 5 is 300 mm, and in the case of Comparative Example 1, as a result of structural analysis, the stress value of the secondary barrier 4, which is the lower layer of the connection insulating wall 3*a* was calculated to be 70.12 MPa.

Comparative Example 2 is a case in which the thickness of the primary insulating wall 3 is 300 mm and the thickness of the secondary insulating wall 5 is 100 mm, and in the case of Comparative Example 2, as a result of structural analysis, the stress value of the secondary barrier 4, which is the lower layer of the connection insulating wall 3*a* was calculated to be 34.29 MPa.

Comparative Example 3 is a case in which the thickness of the primary insulating wall 3 is 140 mm and the thickness of the secondary insulating wall 5 is 260 mm, and in the case of Comparative Example 3, as a result of structural analysis, the stress value of the secondary barrier 4, which is the lower layer of the connection insulating wall 3*a* was calculated to be 59.52 MPa.

In Examples 1 to 5 described above, as a result of structural analysis while increasing the thickness of the primary insulating wall 3 from 160 mm to 240 mm and decreasing the thickness of the secondary insulating wall 5 from 240 mm to 160 mm, the stress value of the secondary barrier 4 which is the lower layer of the connection insulating wall 3*a* was changed from 55.09 MPa to 41.21 MPa, and considering both aspects of the low-temperature stress of the liquefied gas storage tank 1 and the cracking of the hull 7, it was appropriate in this thickness range and stress value.

However, in the case of Comparative Examples 1 to 3, the thickness of the primary insulating wall 3 and the secondary insulating wall 5 is biased toward either side, and considering both aspects of the low-temperature stress of the liquefied gas storage tank 1 and the cracking of the hull 7, it is not preferable to apply as an insulating system of the liquefied gas storage tank 1.

Meanwhile, the material of the secondary barrier 4 may be variously configured, and in this regard, it will be described with reference to FIGS. 22 to 24.

Figure 22:
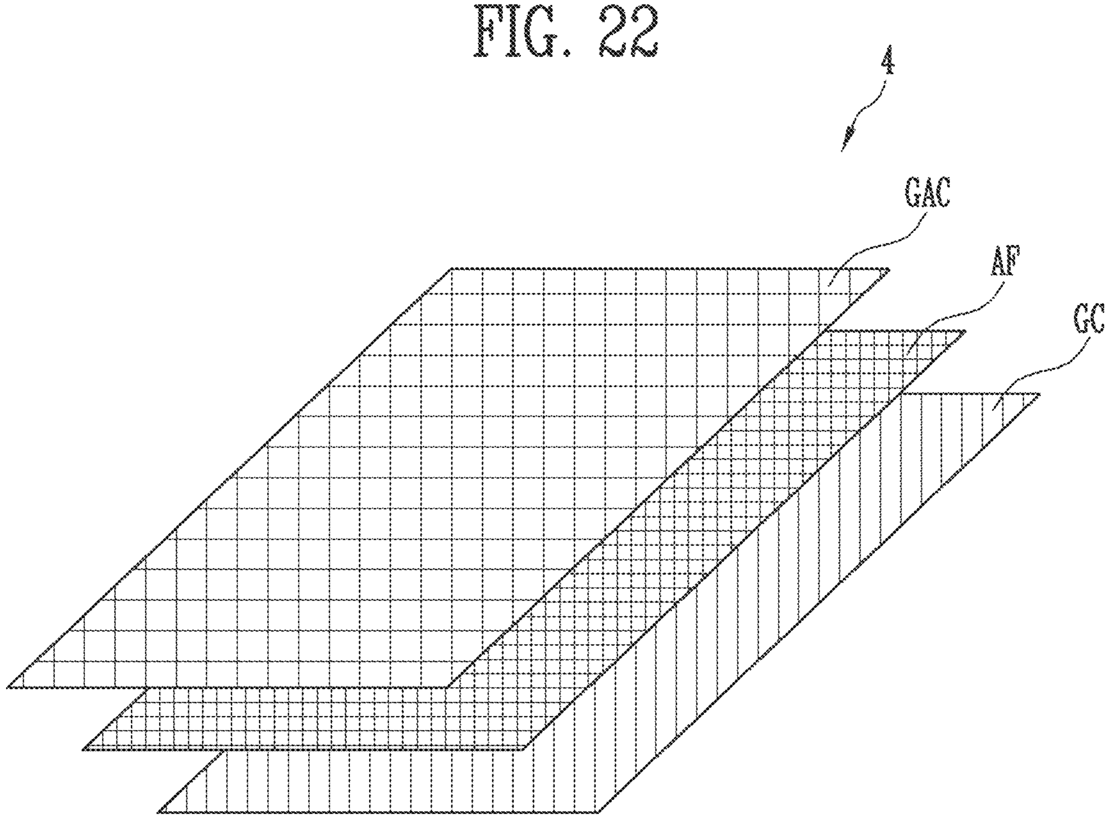
FIGS. 22, 23 and 24 are diagrams for explaining various configurations of a secondary barrier of the liquefied gas storage tank in accordance with the first embodiment of the present disclosure.
Figure 23:
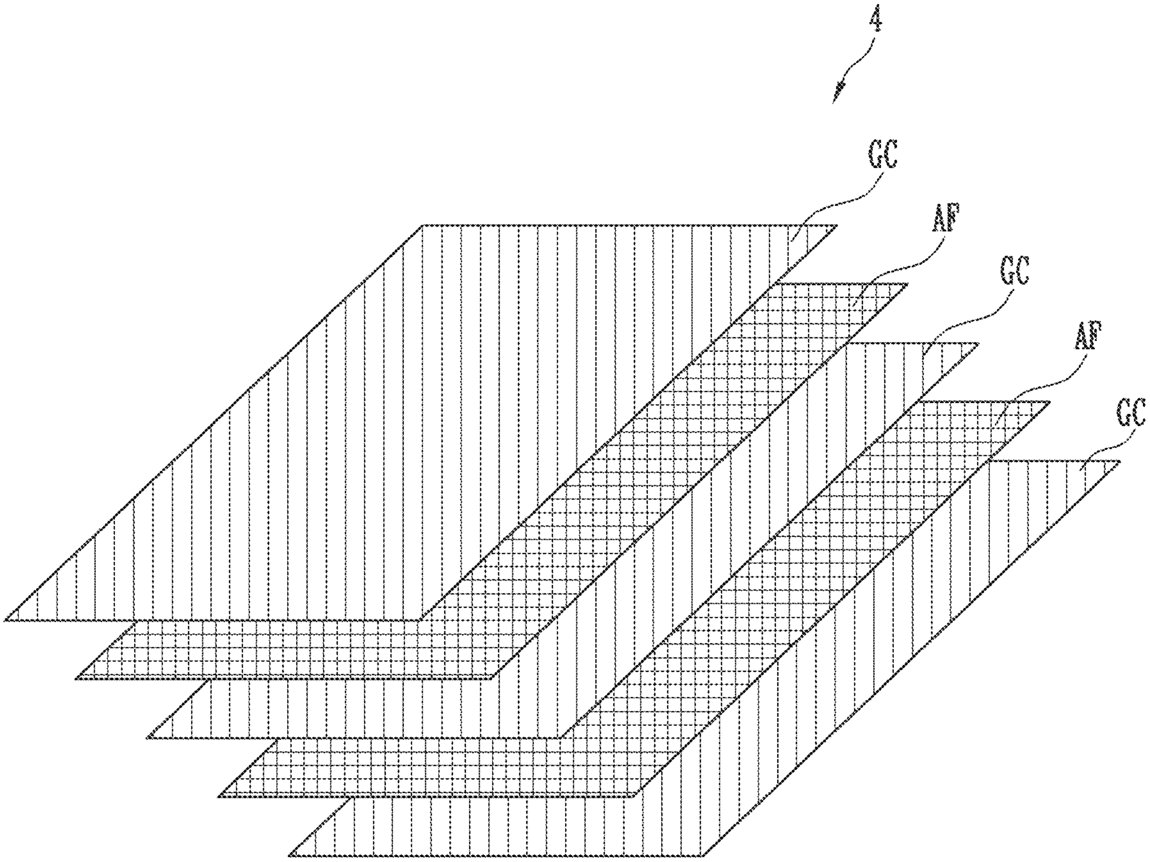
Figure 24:
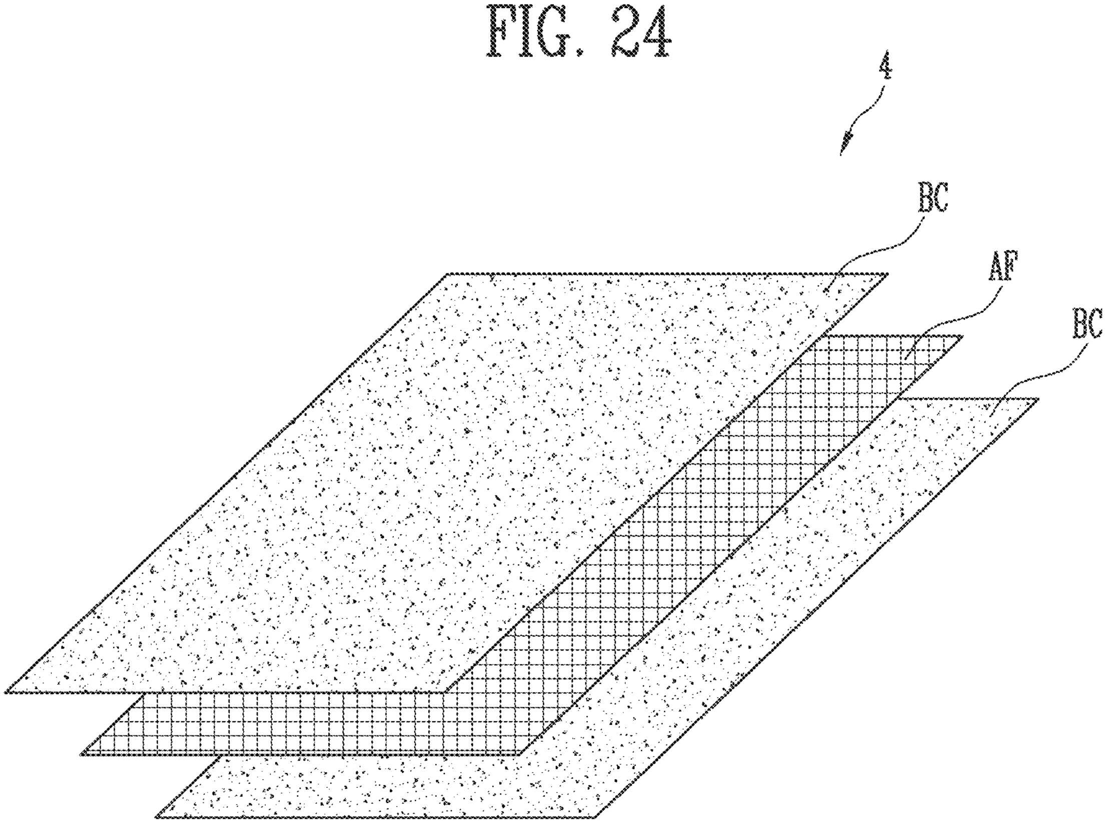

FIGS. 22, 23 and 24 are diagrams for explaining various configurations of the secondary barrier of the liquefied gas storage tank according to the first embodiment of the present disclosure.

As shown in FIG. 22, the secondary barrier 4 may be formed of a first material having a three-layer structure in which a glass fabric (GC)/aluminum foil (AF)/glass-aramid fabric (GAC) is stacked.

GAC is a glass cloth applied with an aramid material, and may be manufactured by mixing 1 line of aramid per 2 lines of glass fiber.

Such a first material may be applied to the auxiliary barrier 42 of the secondary barrier 4, but is not limited thereto, and may be applied to the main barrier 41 of the secondary barrier 4.

As shown in FIG. 23, the secondary barrier 4 may be formed of a second material having a five-layer structure in which GC/AF/GC/AF/GC is stacked.

Such a second material may be applied to the main barrier 41 of the secondary barrier 4, but is not limited thereto, and may also be applied to the auxiliary barrier 42 of the secondary barrier 4.

As shown in FIG. 24, the secondary barrier 4 uses an inorganic basalt fabric extracted from basalt, and may be formed of a third material having a three-layer structure in which basalt fabric (BC)/AF/BC is stacked.

Such a third material may be applied to the main barrier 41 of the secondary barrier 4, but is not limited thereto, and may also be applied to the auxiliary barrier 42 of the secondary barrier 4.

As described in FIGS. 22 to 24, the secondary barrier 4 of the present embodiment may be formed of various materials having a multilayer structure in which the first member/AF/second member are stacked. Here, at least one of the first member and the second member may be GC, GAC, BC, or GC/AF/GC.

In addition, various materials applied to the secondary barrier 4 may be applied in various combinations to the main barrier 41 and the auxiliary barrier 42 of the secondary barrier.

Figure 25:
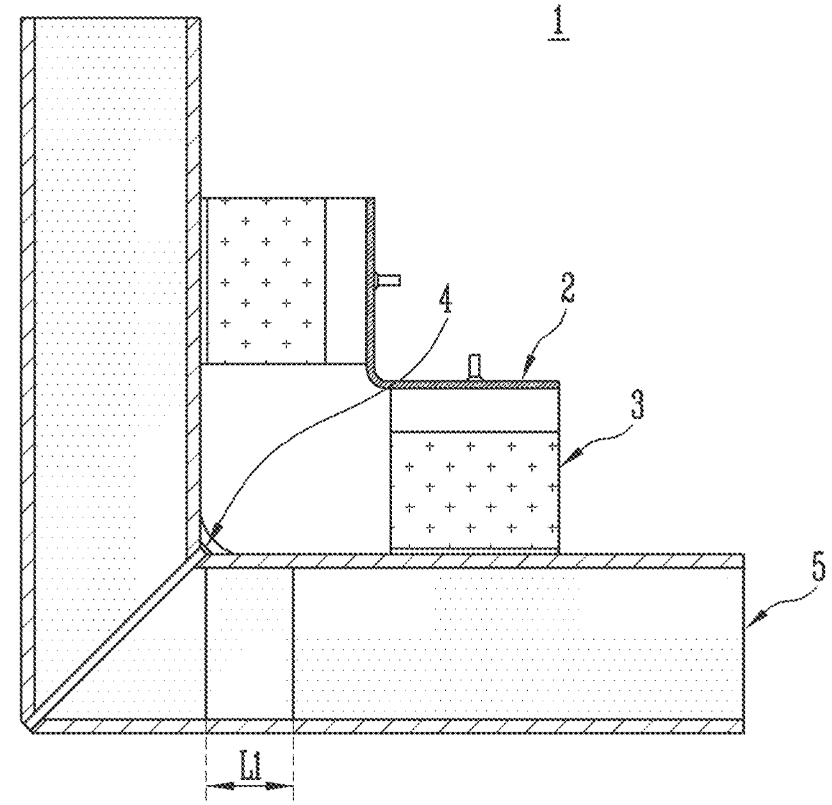
FIG. 25 is a partial cross-sectional view for explaining a right-angle corner structure of the liquefied gas storage tank in accordance with the first embodiment of the present disclosure.
Figure 26:
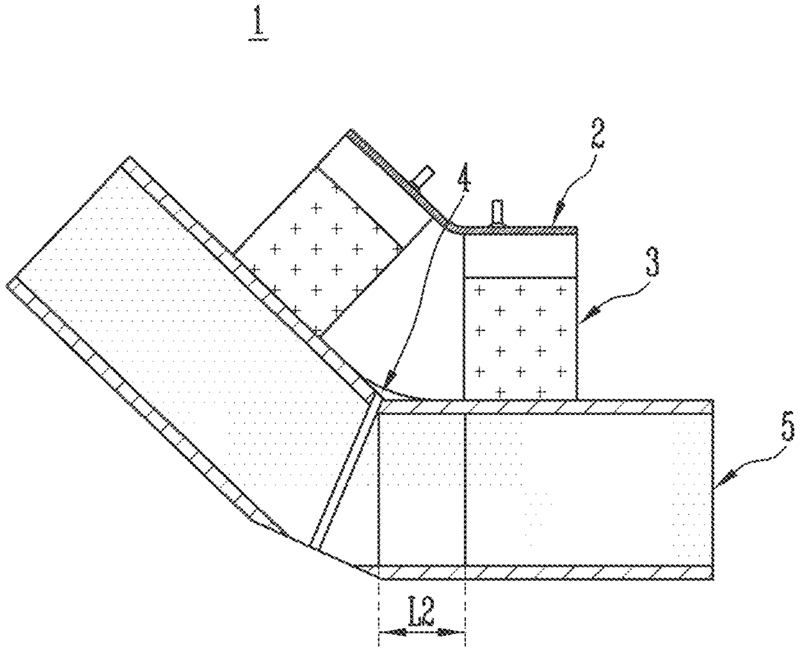
FIG. 26 is a partial cross-sectional view for explaining an obtuse-angle corner structure of the liquefied gas storage tank in accordance with the first embodiment of the present disclosure.

FIG. 25 is a partial cross-sectional view for explaining a right-angle corner structure of the liquefied gas storage tank according to the first embodiment of the present disclosure, and FIG. 26 is a partial cross-sectional view for explaining an obtuse-angle corner structure of the liquefied gas storage tank according to the first embodiment of the present disclosure.

In FIGS. 5 to 20 described above, when the thickness of the connection insulating wall 3*a* or the primary insulating wall 3 and the thickness of the secondary insulating wall 5 are formed in the same or similar range, it was confirmed to have a more stable insulating system. For example, the same or similar range may indicate the case in which the location of the secondary barrier 4 is located at 40% to 60% of the total thickness of the sum of the thicknesses of the connection insulating wall 3*a* or the primary insulating wall 3 and the secondary insulating wall 5. Such a configuration may be equally applied to the right-angle corner structure of the liquefied gas storage tank 1 shown in FIG. 25 and the obtuse-angle corner structure of the liquefied gas storage tank 1 shown in FIG. 26.

However, in the right-angle corner structure and obtuse-angle corner structure of the liquefied gas storage tank 1, the secondary barrier 4 is inevitably formed in a curve, and if it is formed in a curve, it is more vulnerable to the load caused by the surrounding environment compared to the straight portion, and the present embodiment may relieve the stress caused by such a load. In addition, the present embodiment may be easy to absorb the hull deformation.

Referring to FIG. 25, in the right-angle corner structure, as the thickness of the primary insulating wall 3 becomes thicker than that of Case 1 and Case 2, the secondary barrier 4 has a curvature radius of 25% or more, for example, 25% to 50% of the thickness of the primary insulating wall 3.

In addition, in the right-angle corner structure, as the thickness of the primary insulating wall 3 becomes thicker than Case 1 and Case 2, the secondary barrier 4 is moved to the hull 7 side compared to the existing thin-walled primary insulating wall. In this case, the curvature radius increases, and as the curvature radius increases, the length L1 of the secondary barrier 4 scab part not glued to the secondary insulating wall 5 increases as well. This means an increase in the flexibility of the secondary barrier 4 in the right-angle corner structure, and accordingly, in the right-angle corner structure, the secondary barrier 4 may easily absorb peripheral deformation, for example, absorb hull deformation, and the low-temperature stress may also be decreased. For example, the length L1 of the scab part not glued may be 100 mm to 200 mm.

Referring to FIG. 26, in the obtuse-angle corner structure, as the thickness of the primary insulating wall 3 becomes thicker than that of Case 1 and Case 2, the secondary barrier 4 has a curvature radius of 15% or more, for example, 15% to 35% of the thickness of the primary insulating wall 3.

In addition, in the obtuse-angle corner structure, as the thickness of the primary insulating wall 3 becomes thicker than Case 1 and Case 2, the secondary barrier 4 is moved to the hull 7 side compared to the existing thin-walled primary insulating wall, so that the curvature radius increases. In this case, as the curvature radius of the secondary barrier 4 increases, the length L2 of the secondary barrier 4 scab part not glued to the secondary insulating wall 5 increases as well. This means an increase in the flexibility of the secondary barrier 4 in the obtuse-angle corner structure, and accordingly, in the obtuse-angle corner structure, the secondary barrier 4 may easily absorb peripheral deformation, for example, absorb hull deformation, and the low-temperature stress may also be decreased. For example, in this embodiment, the length L2 of the secondary barrier 4 scab part not glued to the secondary insulating wall 5 may be 50 mm to 100 mm, preferably more than 50 mm to less than 100 mm.

The stress change value of the secondary barrier 4 according to the change in the length L2 of the secondary barrier scab part not glued lengthened as the thickness of the primary insulating wall 3 is increased is shown in Table 2 below and FIG. 40.

TABLE 2

| | Length of the scab part not glued (L2) | Stress value (MPa) |
|---|---|---|
| Comparative Example 4 | 50 | 34.47 |
| Example 6 | 60 | 25.56 |
| Example 7 | 70 | 19.71 |
| Example 8 | 80 | 15.63 |
| Example 9 | 90 | 12.84 |
| Example 10 | 97.3 | 11.17 |

Figure 40:
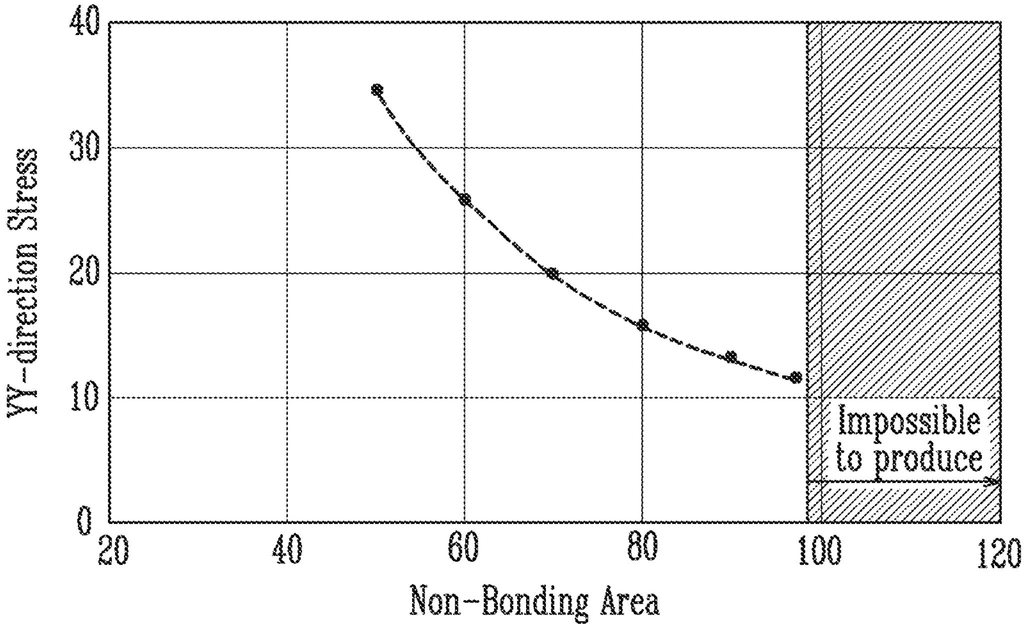
FIG. 40 is a graph illustrating a stress change value of a secondary barrier according to a length change of a non-bonding area where a secondary barrier is not bonded to a secondary insulating wall in an obtuse-angle corner structure.

As shown in Table 2 and FIG. 40, it may be seen that as the length L2 of the scab part not glued increases, the stress change value of the secondary barrier 4 decreases, and this means that as the length L2 of the scab part not glued increases, the flexibility of the secondary barrier 4 in the obtuse-angle corner structure increases. In the case of the present disclosure, as the thickness of the primary insulating wall 3 may be formed to be the same as or similar to the thickness of the secondary insulating wall 5, a secondary barrier 4 with a long length L2 of the scab part not glued may be formed as in Example 6 to Example 10 as well as Comparative Example 4.

As described above, in the secondary barrier 4 in the right-angle corner structure and the obtuse-angle corner structure of the present disclosure, compared to the right-angle corner structure and the obtuse-angle corner structure of the primary insulating wall formed with a relatively thin thickness, the stress at low-temperature applied to the existing secondary barrier may be reduced. In addition, since the scab part not glued increases, it is also easy to absorb the hull deformation.

Figure 27:
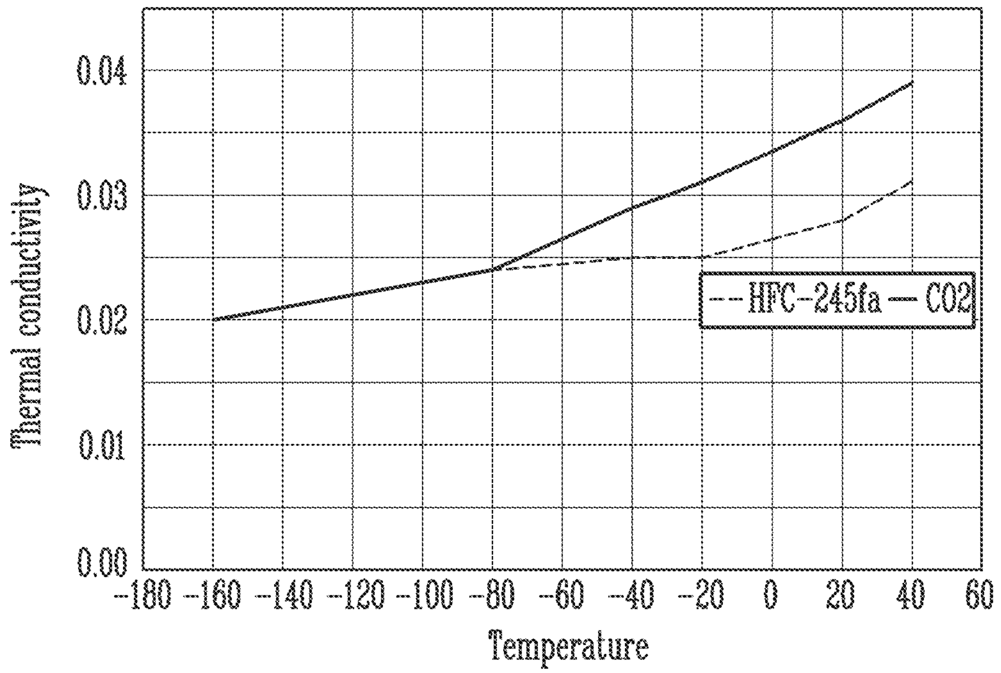
FIG. 27 is a graph illustrating thermal conductivity according to the materials used for a primary insulating material and a secondary insulating material of the liquefied gas storage tank of the present disclosure.

FIG. 27 is a graph illustrating thermal conductivity according to the materials used for a primary insulating material and a secondary insulating material of the liquefied gas storage tank.

In the liquefied gas storage tank 1 according to the embodiment of the present disclosure, each of the primary insulating materials 32 and 32*a* of the connection insulating wall 3*a* and the primary insulating wall 3 and the secondary insulating material 51 of the secondary insulating wall 5 have been described to be formed of polyurethane foam of the same material, but in some cases, polyurethane foam of different materials may be optionally used.

Specifically, the reinforced polyurethane foam (RPUF) is produced by mixing polyol, isocyanate, and a blowing agent, and HFC-245fa or $CO_2$ may be used as the blowing agent. HFC-245fa may be relatively expensive compared to $CO_2$.

In the case of this embodiment, the primary insulating material 32, 32*a* is formed of a reinforced polyurethane foam in which $CO_2$ is used as a blowing agent, and the secondary insulating material 51 is formed of a reinforced polyurethane foam in which the blowing agent HFC-245fa is used.

Looking at the thermal conductivity characteristics of the blowing agent HFC-245fa and the blowing agent $CO_2$ with reference to the graph of FIG. 27, the blowing agent HFC-245fa has a lower thermal conductivity value at room temperature compared to the blowing agent $CO_2$, but shows the same or similar value toward the cryogenic temperature.

In other words, the thermal conductivity values of the blowing agent HFC-245fa and the blowing agent $CO_2$ show the same or similar values at temperatures below −80° C., and at the above temperature, the blowing agent HFC-245fa shows a lower value than the blowing agent $CO_2$.

Accordingly, this embodiment does not use the relatively expensive blowing agent HFC-245fa for both the primary insulating material 32, 32*a* and the secondary insulating material 51, and in consideration of the economical aspect, the primary insulating material 32, 32*a*, which is relatively close to cryogenic temperatures, may be formed of reinforced polyurethane foam using $CO_2$ as a blowing agent, and the secondary insulating material 51 may be formed of a reinforced polyurethane foam using the blowing agent HFC-245fa.

Figure 28:
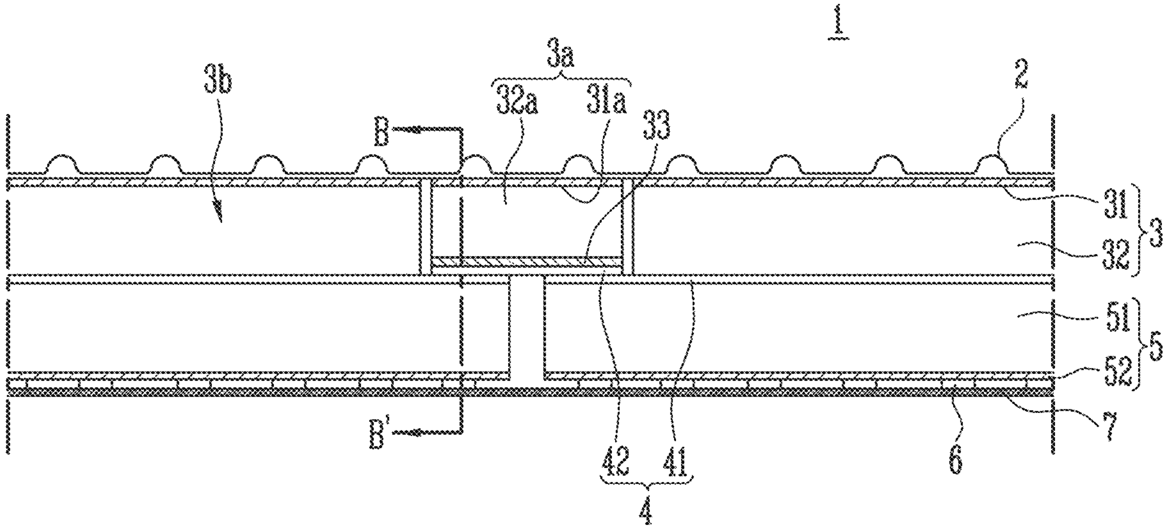
FIG. 28 is a partial cross-sectional view for explaining a liquefied gas storage tank in accordance with a second embodiment of the present disclosure.
Figure 29:
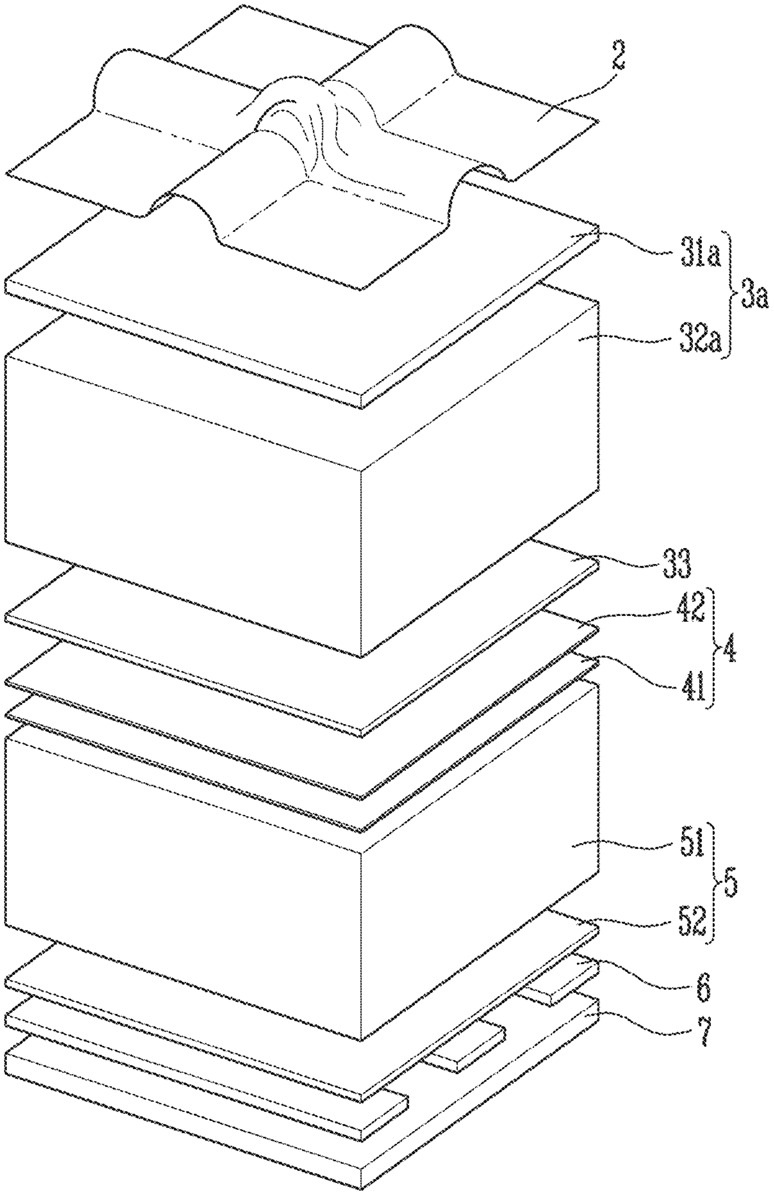
FIG. 29 is a partial perspective view for explaining a liquefied gas storage tank in accordance with the second embodiment of the present disclosure.

FIG. 28 is a partial cross-sectional view for explaining a liquefied gas storage tank according to a second embodiment of the present disclosure, and FIG. 29 is a partial perspective view for explaining a liquefied gas storage tank according to a second embodiment of the present disclosure.

As shown in FIGS. 28 to 29, a liquefied gas storage tank 1 according to the second embodiment of the present disclosure may be configured to include a primary barrier 2 in contact with the liquefied gas from the inside, a primary insulating wall 3 and a connection insulating wall 3*a* installed on the outside of the primary barrier 2, a secondary barrier 4 installed on the outside of the primary insulating wall 3 and the connection insulating wall 3*a*, and a secondary insulating wall 5 disposed on the outside of the secondary barrier 4 and fixed to the hull 7, and since the configuration of the connection insulating wall 3*a* is different from that of the first embodiment described above, and other configurations are the same or similar, only the different parts will be described below to avoid overlapping description.

In this embodiment, as compared with the above-described first embodiment, the configuration of the connection insulating wall 3*a* may be different.

Specifically, as compared with the above-described first embodiment, the connection insulating wall 3*a* may further include an auxiliary insulating plate 33.

In other words, the connection insulating wall 3*a* may have a structure in which the connection plywood 31*a*, the connection insulating material 32*a*, and the auxiliary insulating plate 33 are stacked.

The auxiliary insulating plate 33 may have a thickness of 5 mm to 10 mm, and may be provided with plywood, high-density polyurethane foam (HD PUF), fiber reinforced plastic (FRP), or the like to obtain the load distribution effect of the secondary barrier 4. Alternatively, the auxiliary insulating plate 33 may be made of vacuum insulation panel (VIP), LD PUF, or the like having excellent insulating properties to compensate for the insulating vulnerability in the portion where the connection insulating wall 3*a* is formed. It is provided with VIP (Vacuum Insulation Panel), LD PUF, etc. with excellent characteristics to compensate for the insulation vulnerability in the part where the connection insulation wall 3*a* is formed.

The thickness of the primary insulating material 32 of the fixed insulating wall 3*b* constituting the unit element and the connecting insulating material 32*a* of the connection insulating wall 3*a* may be the same. However, in the case of the connection insulating wall 3*a*, an auxiliary barrier 42 is further stacked in addition to the main barrier 41 of the secondary barrier 4 at the lower portion, and also includes an auxiliary insulating plate 33, the thickness of the connection insulating material 32*a* of the connection insulating wall 3*a* may be a thickness smaller than that of the primary insulating material 32 of the primary insulating wall 3 by 5 mm to 10 mm in the thickness of the auxiliary barrier 42 and the thickness of the auxiliary insulating plate 33.

The auxiliary insulating plate 33 described above may be installed not only at the lower portion of the connection insulating material 32*a* of the connection insulating wall 3*a* but also at the lower portion of the primary insulating material 32 of the primary insulating wall 3 constituting the unit element.

Figure 30:
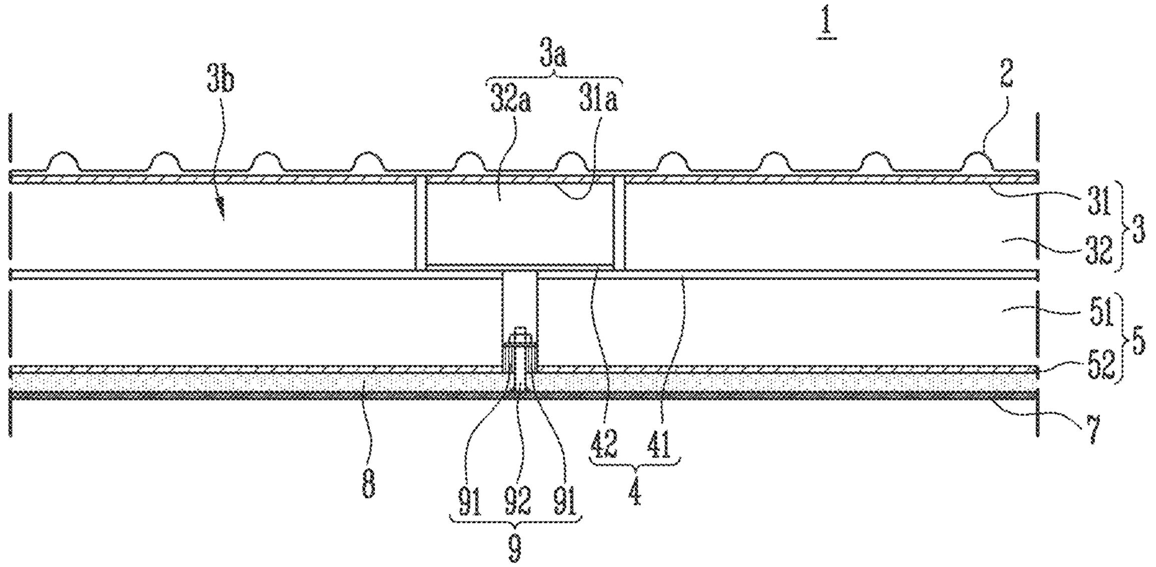
FIG. 30 is a partial cross-sectional view for explaining the liquefied gas storage tank in accordance with a third embodiment of the present disclosure.
Figure 31:
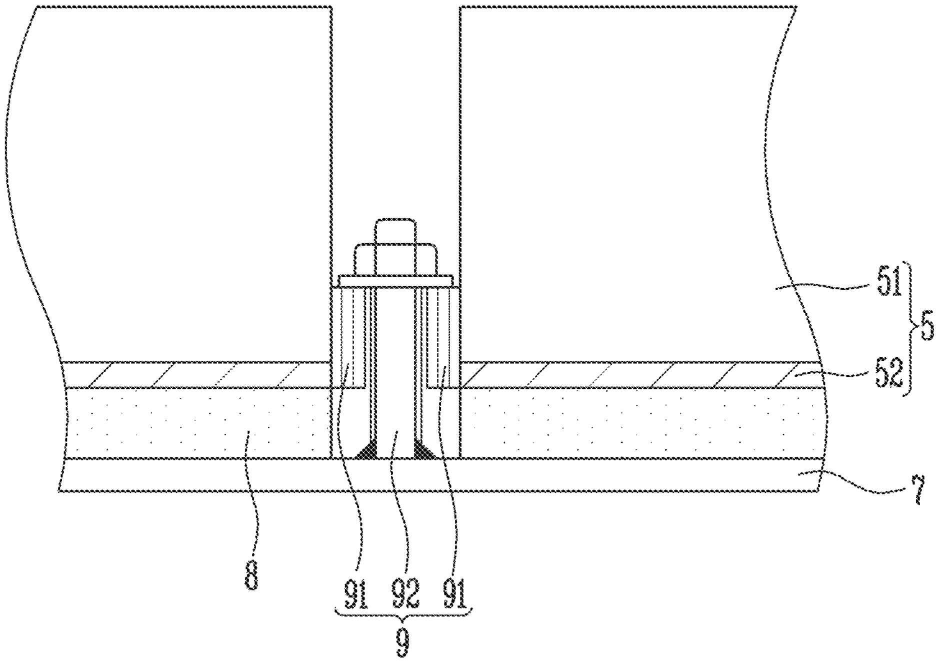
FIG. 31 is an enlarged view of a main part of a liquefied gas storage tank in accordance with the third embodiment of the present disclosure.

FIG. 30 is a partial cross-sectional view for explaining the liquefied gas storage tank according to the third embodiment of the present disclosure, and FIG. 31 is an enlarged view of a main part of a liquefied gas storage tank according to a third embodiment of the present disclosure.

As shown in FIGS. 30 to 31, the liquefied gas storage tank 1 according to the third embodiment of the present disclosure may be configured to include a primary barrier 2 in contact with the liquefied gas from the inside, a primary insulating wall 3 and a connection insulating wall 3*a* installed on the outside of the primary barrier 2, a secondary barrier 4 installed on the outside of the primary insulating wall 3 and the connection insulating wall 3*a*, a secondary insulating wall 5 disposed on the outside of the secondary barrier 4 and fixed to the hull 7, a leveling member 8 installed between the secondary insulating wall 5 and the hull 7, and a fixing member 9 for fixing the secondary insulating wall 5 to the hull 7, and since compared with the first embodiment described above, the leveling member 8 and the fixing member 9 are different, and other configurations are the same or similar, hereinafter, in order to avoid overlapping description, only the leveling member 8 and the fixing member 9, which are components different from those of the first embodiment, and parts that are different therefrom will be described.

The leveling member 8 may be installed between the secondary insulating wall 5 and the hull 7.

The leveling member 8 is a non-adhesive elastic insulating material that may level the deformed portion of the hull 7, increase the insulating performance of the tank, and support the secondary insulating wall 5, and may be expanded polystyrene (EPS) or the like.

The leveling member 8, the upper surface in close contact with the secondary insulating wall 5 by the elastic force becomes flat, and the lower surface in close contact with the hull 7 may have a curved surface to fit the deformation of the hull 7. Deformation of the hull 7 may occur, for example, during inter-block welding of the hull 7.

In other words, the leveling member 8 may level the deformed portion of the hull without using the existing mastic and leveling wedge. Here, the leveling wedge may be selectively used.

In this embodiment, by applying the leveling member 8 as described above, unlike mastic which is applied in several types depending on the size of the existing gap, it may be installed in a single size, and since the mastic curing time is not required, the working time may be shortened, and by applying the insulating material, heat retention may be increased.

The fixing member 9 may have a cleat structure including a protruding portion 91 and a stud bolt 92 so as to fix the secondary insulating wall 5 to the hull 7.

The protruding portion 91 may be provided to protrude from both side lower portions of the unit panel of the secondary insulating wall to the outside, and may be formed of plywood.

The protruding portion 91 may be fixedly installed on one side of the side of the secondary plywood 52 of the secondary insulating wall 5 and some side of the secondary insulating material 51 from the secondary plywood 52 to a certain height, and the lower surface forms the same level as the lower surface of the secondary plywood 52.

The width and thickness of the protruding portion 91 may be such that the stud bolt 92 may be inserted between the protruding portions 91 facing each other when a plurality of unit panels constituting the secondary insulating wall 5 are disposed.

The stud bolt 92 may be fixed to the hull 7.

When disposing a plurality of unit panels constituting the secondary insulating wall 5, the stud bolt 92 may be fixedly installed on the hull 7 so as to match the space between the unit panels of the adjacent secondary insulating wall 5.

The stud bolts 92 are provided on each side of the unit panel of the adjacent secondary insulating wall 5 and may fix the secondary insulating wall 5 to the hull 7 by tightening the bolts in a state located between the two opposing protruding portions 91.

As such, the present embodiment may maintain the mechanical strength of the secondary insulating wall 5 at a certain level, as well as reduce the low-temperature burden and the sloshing burden of the secondary barrier 4 to prevent damage to the secondary barrier 4, by configuring the thickness of the primary insulating wall 3, 3*a* the same as or similar to the secondary insulating wall 5, in the total thickness of the primary insulating wall 3 and the secondary insulating wall 5 encompassing the connection insulating wall 3*a*.

In addition, the present embodiment may further increase the insulating performance in the connection portion of the adjacent secondary insulating walls 5 constituting the unit element, by providing an auxiliary insulating plate 33 on the lower surface of the connection insulating wall 3*a* provided in the space between the adjacent primary insulating walls 3 constituting the unit element.

In addition, the present embodiment may improve the configuration of the secondary barrier 4 to increase the insulating performance.

In addition, in the present embodiment, by applying a non-adhesive elastic insulating material to the leveling member 8 of the secondary insulating wall 5 between the secondary insulating wall 5 and the hull 7, even if the existing mastic and leveling wedge are not used, the deformed portion of the hull 7 may be leveled and the insulating performance of the tank may be increased.

In addition, in the present embodiment, by fixing the unit panel of the adjacent secondary insulating wall 5 in a cleat structure method by the stud bolts 92 fixed to the hull 7, and a protruding portion 91 provided to protrude outward from the lower side of the unit panel of the secondary insulating wall 5, man-hours may be reduced compared to the method of fixing the unit panel with stud bolts by drilling a hole in the secondary insulating wall (5).

The present disclosure is not limited to the embodiments described above, and a combination of the embodiments or a combination of at least one of the embodiments and a known technology may be included as another embodiment. For example, the embodiment of FIGS. 28 to 29 may be combined with the embodiment of FIGS. 4 to 27. Further, for example, the embodiment of FIGS. 30 to 31 may be combined with the insulating system of FIGS. 1 and 2 or the insulating system of FIGS. 28 and 29.

Hereinafter, the shape of the primary barrier of the liquefied gas storage tank described above will be described in detail with reference to FIGS. 32 to 39.

Figure 32:
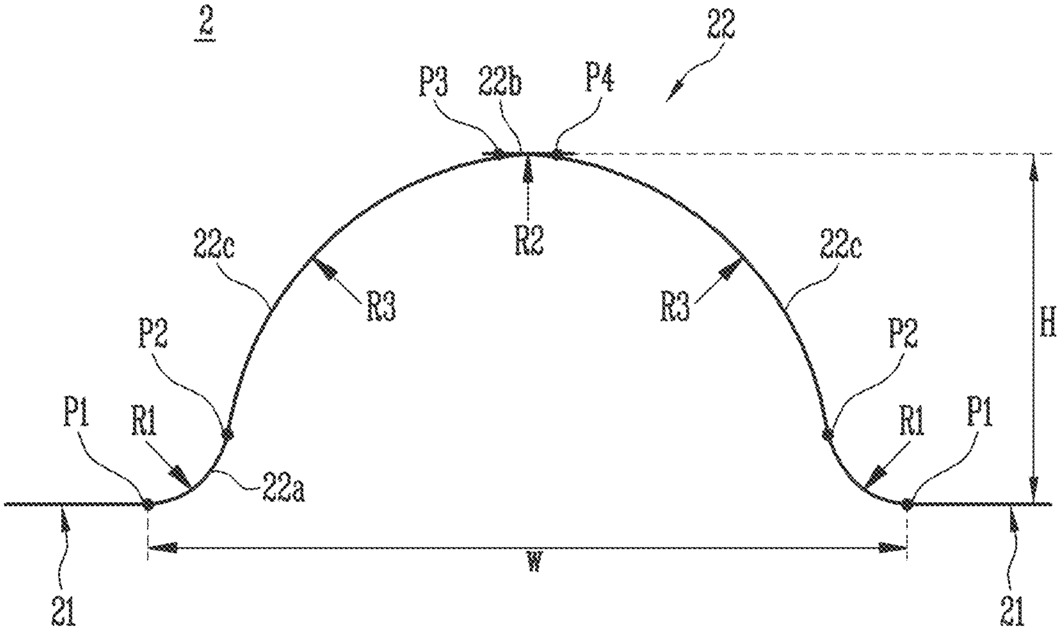
FIG. 32 is a diagram for explaining another embodiment of the primary barrier of the liquefied gas storage tank in accordance with the first, second, and third embodiments of the present disclosure.
Figure 33:
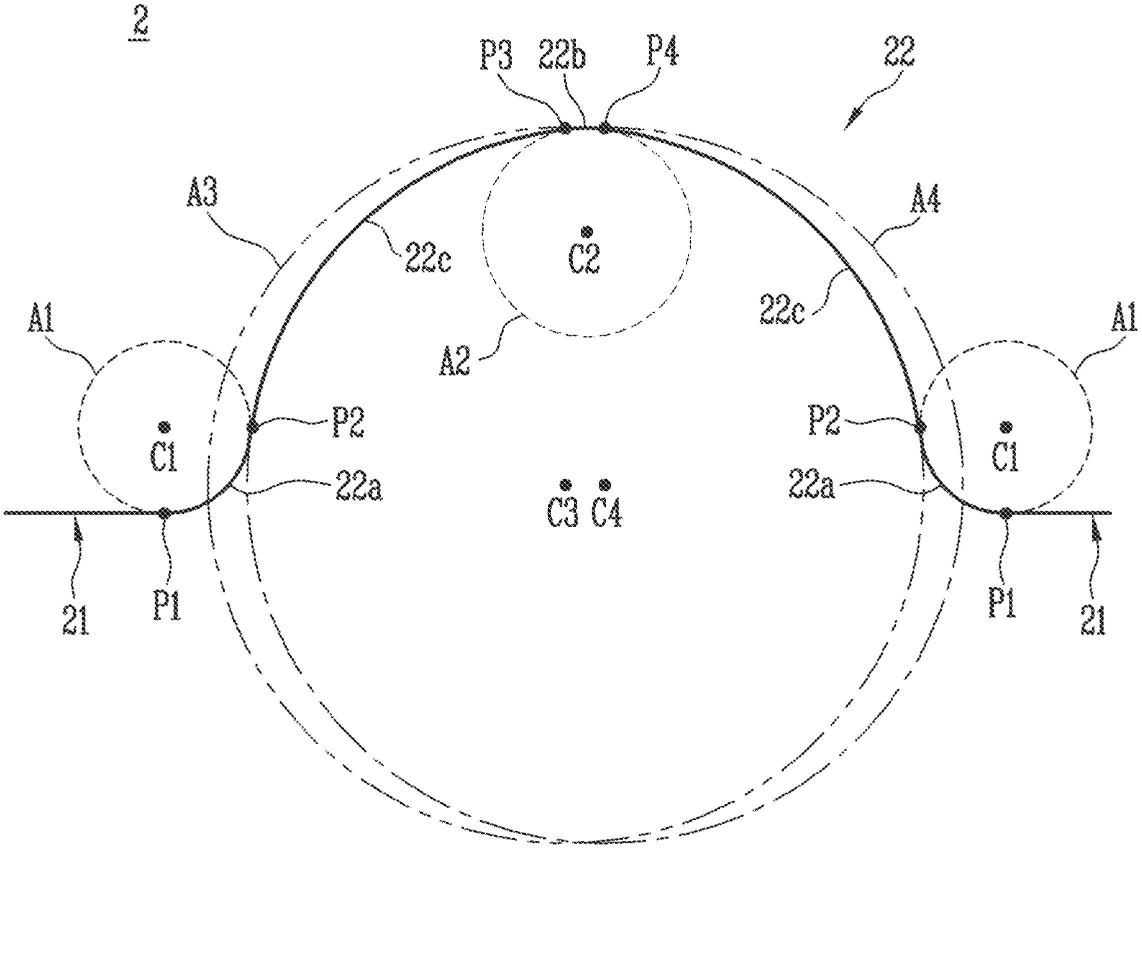
FIG. 33 is a diagram for explaining a shape of a primary barrier.

FIG. 32 is a diagram for explaining another embodiment of a primary barrier of the liquefied gas storage tank according to the first, second, and third embodiments of the present disclosure, and FIG. 33 is a diagram for explaining a shape of a primary barrier.

As shown in FIGS. 32 to 33, in the primary barrier 2 of the liquefied gas storage tank 1 according to the first, second, and third embodiments of the present disclosure, compared with the primary barrier 2 formed to have two types of curvature radii R1, R2 described with reference to FIG. 3, the cross-sectional shape may be different, which will be described in detail below.

Referring to FIG. 32, the primary barrier 2 may consist of a plurality of flat portions 21 in contact with the upper surface of the primary insulating wall 3, and a plurality of curved portions 22 for relieving contraction or expansion stress due to temperature.

The curved portion 22 of this embodiment has a cross-sectional shape such that the ratio (W/H) of the width (W) between the adjacent flat portions 21 to the height (H) from the flat portion 21 to the upper end of the curved portion 22 is in the range of 2.0 to 3.0 ($2.0 \leq W/H \leq 3.0$), so as to minimize the thermal stress caused by the low temperature as well as the pressure stress burden caused by the sloshing.

Here, the width (W) of the curved portion 22 may be 50 mm~105 mm, preferably 65 mm~93 mm, more preferably 70 mm~80 mm, and the height (H) of the curved portion 22 may be 30 mm~50 mm, preferably 30 mm~45 mm, more preferably 33 mm~40 mm.

The plurality of curved portions 22 may be formed to cross the horizontal and vertical directions, and the horizontal curved portion 22 and the vertical curved portion 22 may have the same size. In other words, since the size of the horizontal and vertical curved portions 22 in the entire primary barrier 2 is the same, the primary barrier may be easily manufactured.

Figure 35:
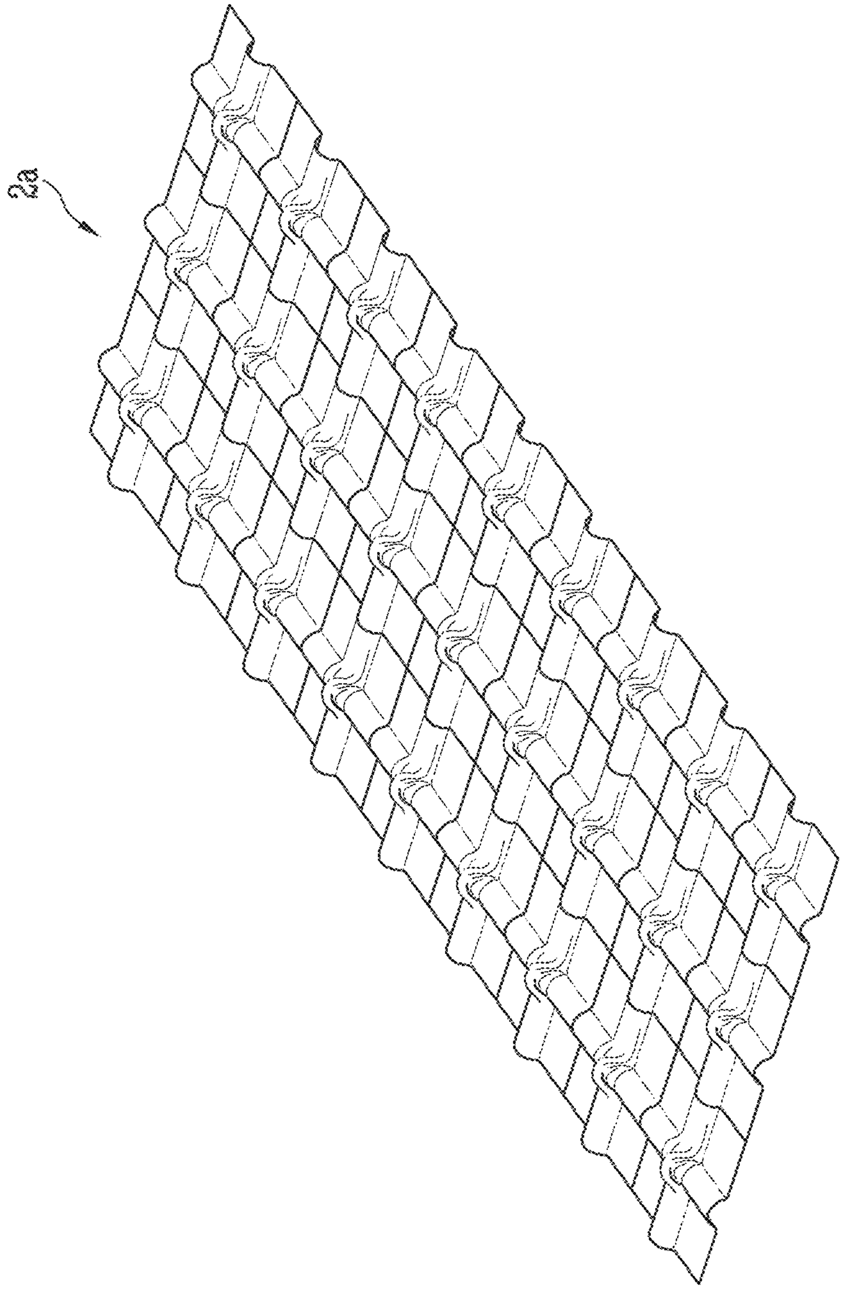
FIG. 35 is a perspective view for explaining a unit barrier of a primary barrier.

In addition, the plurality of curved portions 22 has a wider interval between adjacent curved portions 22 than the known (herein, known may be used as a term 'comparative object' hereinafter), for example, it may be made to have an interval of 350 mm or 400 mm. Here, the interval between the curved portions 22 may correspond to the interval between the uppermost points of the curved portion 22. In addition, as shown in FIG. 35, the size of the plurality of unit barriers 2*a* constituting the primary barrier 2 may be formed in a size of larger 3:1 ratio than the known, for example, 3,150 mm~3,600 mm in length and 1,050 mm~1,200 mm in width.

As such, widening the interval between the curved portions 22 and increasing the size of the unit barrier 2*a* in the first barrier 2 of this embodiment is possible due to the cross-sectional shape of the curved portion 22 having the ratio (W/H) of the width (W) between the adjacent flat portions 21 to the height (H) from the flat portion 21 to the upper end of the curved portion 22 in the range of 2.0 to 3.0 ($2.0 \leq W/H \leq 3.0$), which will be further understood by the following description with reference to FIGS. 36 to 39.

Meanwhile, as shown in FIG. 2, the horizontal curved portion and the vertical curved portion may be formed to cross each other. Here, the horizontal curved portion and the vertical curved portion may have the same height and width, respectively.

In addition, the curved portion 22 may be formed in a cross-sectional shape having first, second, and third curved portions 22*a*, 22*b*, and 22*c* having different curvature radii.

The first curved portion 22*a* is connected to each of the adjacent flat portions 21 to form a pair, and has a first curvature radius r1. The first curvature radius r1 may be 4 mm~12 mm.

Each of the pair of first curved portions 22*a* may have a curved shape having a first curvature radius r1 between the first connection point P1 connected to the flat portion 21 and the second connection point P2 connected to each of the pair of third curved portions 22*c*.

Here, the first connection point P1 may be in the same location as the point at which the lowermost curved portion of the first circle A1 having the first curvature radius r1 from the first curvature center C1 on the accommodating space side and the vertical center line of the first circle A1 intersect. The first curvature center C1 of the first curved portion 22*a* may be located above the virtual plane formed by the flat portion 21.

The second connection point P2 may be located on the curved portion of the first circle A1 within an angle of 30 degrees downward from the point where the curve of the first circle A1 and the horizontal center line of the first circle A1 intersect.

The second curved portion 22*b* forms an upper portion of the curved portion 22 and has at least a second curvature radius r2 greater than the first curvature radius r1. Here, the second curvature radius r2 may be 7 mm~15 mm.

The second curved portion 22*b* may have a curved shape having a second curvature radius r2 between a third connection point P3 connected to any one of the third curved portions 22*c* of the pair of third curved portions 22*c* and a fourth connection point P4 connected to the other third curved portion 22*c*.

Here, each of the third connection point P3 and the fourth connection point P4 may be located on a curved portion of the second circle A2 between a certain angle on both sides of the vertical center line of the second circle A2 having a second curvature radius r2 from the second curvature center C2 on the opposite side of the accommodating space, for example, between 3 degrees and 10 degrees. The second curvature center C2 of the second curved portion 22*b* may be located above the virtual plane formed by the flat portion 21.

The third curved portion 22*c* is formed as a pair connecting each of the pair of first curved portions 22*a* and the second curved portion 22*b*, and has a curvature radius r3 at least greater than the second curvature radius r2. Here, the third curvature radius r3 may be 25 mm~45 mm.

In other words, the sizes of the first, second, and third curvature radii r1, r2, and r3 of each of the first, second, and third curved portions 22*a*, 22*b*, and 22*c* may be 'first curvature radius r1≤the second curvature radius r2<the third curvature radius r3.' In this embodiment, the size of the third curvature radius r3 may be greater than the sum of the size of the second curvature radius r2 and the size of the first curvature radius r1.

The third curved portion 22*c* of any one of the pair of third curved portions 22*c* may have a curved shape having a third curvature radius r3 between a second connection point P2 to which one of the first curved portions 22*a* of the pair of first curved portions 22*a* is connected, and a third connection point P3 to which one side of the second curved portion 22*b* is connected.

Any one of the third curved portions 22*c* may be provided on the curved portion of the third circle A3 having a third curvature radius r3 from the third curvature center C3 on the opposite side of the accommodating space.

In addition, the third curved portion 22*c* of the other of the pair of third curved portions 22*c* may have a curved shape having a third curvature radius r3 between a second connection point P2 to which the other first curved portion 22*a* of the pair of first curved portions 22*a* is connected and a fourth connection point P4 to which the other side of the second curved portion 22*b* is connected.

Another third curved portion 22*c* may be provided on the curved portion of the fourth circle A4 having a third curvature radius r3 from the fourth curvature center C4 on the opposite side of the accommodating space.

In the above, of each of the second, third, and fourth connection points P2, P3, and P4, when looking at the location based on the pair of third curved portions 22*c*, the second connection point P2 may be a point where the curve of the first circle A1 and the third circle curve of the first curved portion 22*a* of any one of the pair of first curved portions 22*a*, or the curve of the first circle A1 and the curve of the fourth circle A4 of the other first curved portion 22*a* of the pair of first curved portions 22*a* meet.

In addition, the third connection point P3 may be a point where the curve of the second circle A2 and the curve of the third circle A3 meet. The third connection point P3 may be the same location as a point where the uppermost curved portion of the third circle A3 and the vertical center line of the third circle A3 intersect.

The fourth connection point P4 may be a point where the curve of the second circle A2 and the curve of the fourth circle A4 meet. The fourth connection point P4 may be the same location as a point where the uppermost curved portion of the fourth circle A4 and the vertical center line of the fourth circle A4 intersect.

The pair of third curved portions 22*c* have a third curvature radius r3 of the same size, and the third curvature center C3 of any one third curved portion 22*c* and the fourth curvature center C4 of the other third curved portion 22*c* may be located to be shifted in the horizontal direction. In addition, the third and fourth curvature centers C3 and C4 of the present embodiment are located inside the curved portion 22. Accordingly, the third and fourth curvature centers C3 and C4 are located inside the curved portion 22 above the virtual line when the adjacent flat portions 21 are connected by an imaginary line. In other words, the third and fourth curvature centers C3 and C4 of the third curved portion 22*c* may be located above the virtual plane formed by the flat portion 21.

As described above, all the curvature centers C1, C2, C3, and C4 of the curved portion 22 of the present embodiment may be located above the virtual plane formed by the flat portion 21.

Figure 34A:
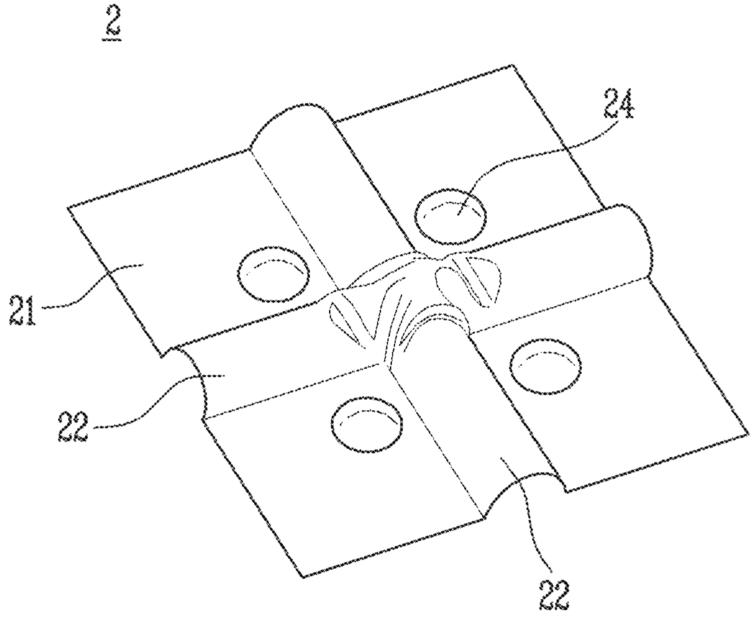
FIGS. 34A and 34B are diagrams for explaining a protruding structure provided on a primary barrier.

FIGS. 34A and B are diagrams for explaining a protruding structure provided on a primary barrier.

Figure 34B:
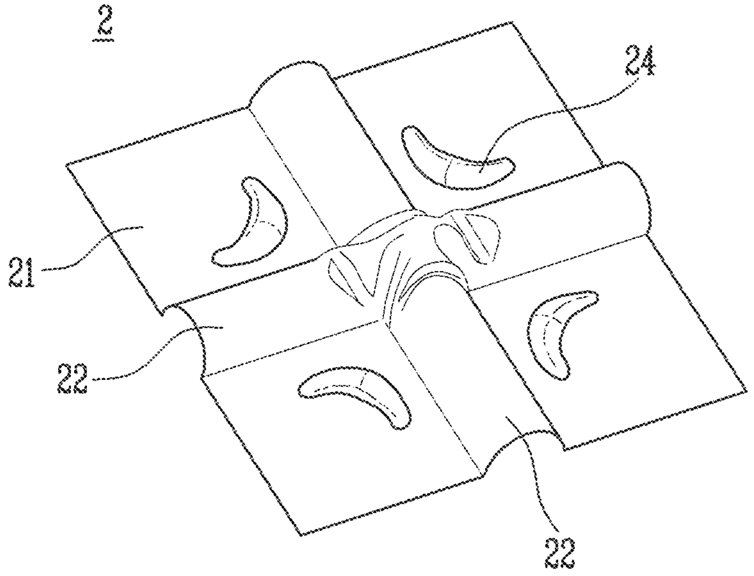

As shown in FIGS. 34 A and B, the primary barrier 2 of the present embodiment may further include a protruding structure 24 in the peripheral flat portion 21 of the intersection where the horizontal curved portion 22 and the vertical curved portion 22 intersect. For example, the protruding structure 24 may be provided within a predetermined distance from the intersection. In addition, the predetermined distance may correspond to ⅓ of the distance between intersections located on the same line, but is not limited thereto.

The protruding structure 24 is smaller in size than the horizontal curved portion 22 and the vertical curved portion 22, and may be formed in various shapes such as a convex circle as shown in FIG. 34 A or an arc shape as shown in FIG. 34 B.

The protruding structure 24 may further minimize a pressure stress burden due to sloshing at a portion where the horizontal curved portion 22 and the vertical curved portion 22 intersect.

FIG. 35 is a perspective view for explaining a unit barrier of a primary barrier.

The primary barrier 2 according to this embodiment may make the interval between the adjacent curved portions 22 to be a distance of 350 mm~400 mm which wider than known, and as a result, as shown in FIG. 35, the size of the plurality of unit barriers 2*a* constituting the primary barrier 2 may be formed in a size of larger 3:1 ratio than the known, for example, 3,150 mm~3,600 mm in length and 1,050 mm~1, 200 mm in width. In this embodiment, by increasing the size of the unit barriers 2*a*, the number of installations of the unit barriers 2*a* may be reduced compared to the existing ones, and the number of installation labors for the primary barriers 2 may be reduced.

In addition, in the unit barrier 2*a* shown in FIG. 35, the width between the uppermost ends of the curved portion 22 may correspond to 350 mm~400 mm. Here, the uppermost end of the curved portion 22 may correspond to the uppermost point of the second curved portion 22*b* of FIG. 32. This is because the width between the uppermost ends of the curved portion is increased compared to the comparative unit barrier (known unit barrier), and it is easier to produce and install than the comparative unit barrier. In addition, since the unit barrier 2*a* according to the embodiment of the present disclosure has the same width and height of the horizontal curved portion 22 and the vertical curved portion 22, it is possible to reduce the manufacturing cost compared to the comparative unit barrier.

Figure 36:
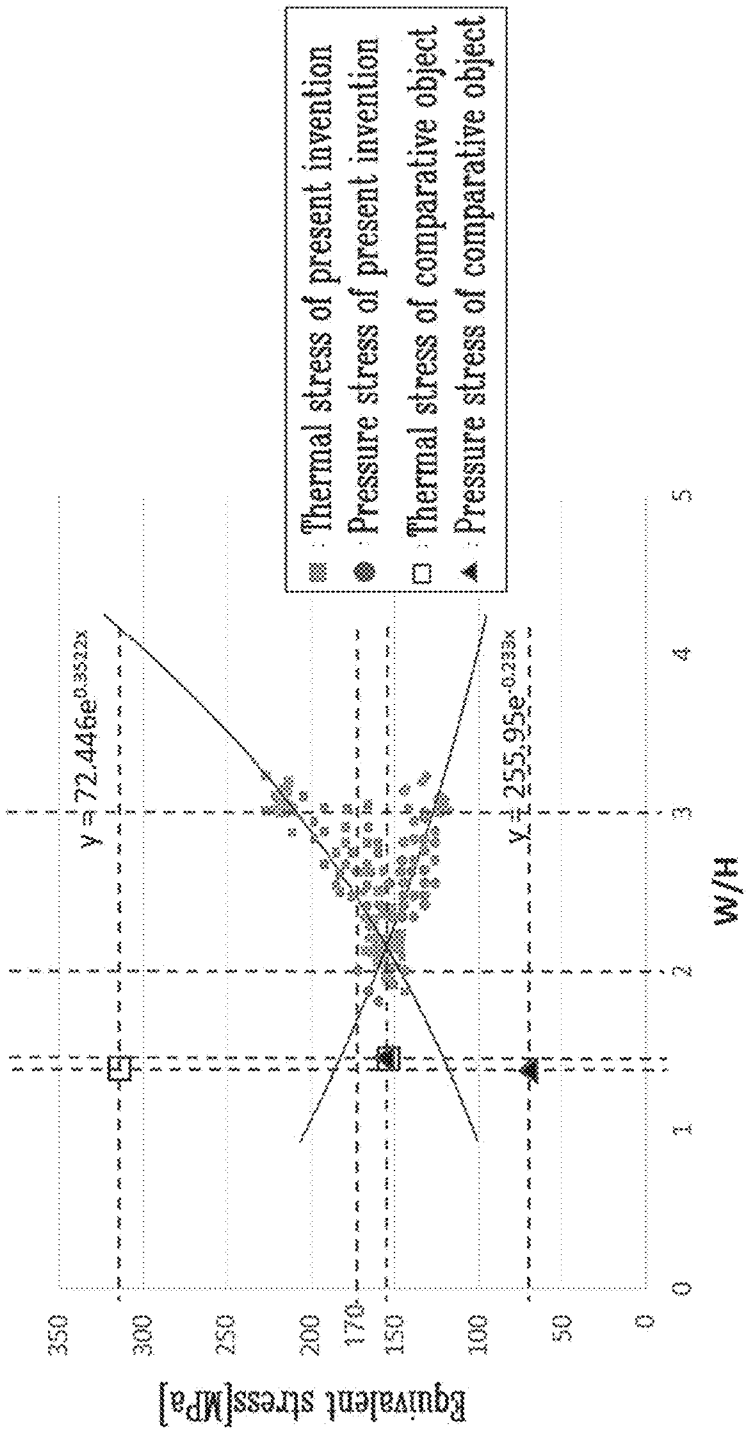
FIG. 36 is a diagram illustrating a distribution of Mises stress values (thermal stress and pressure stress) according to a ratio (W/H) of a curved portion width to a curved portion height of a primary barrier.
Figure 37:
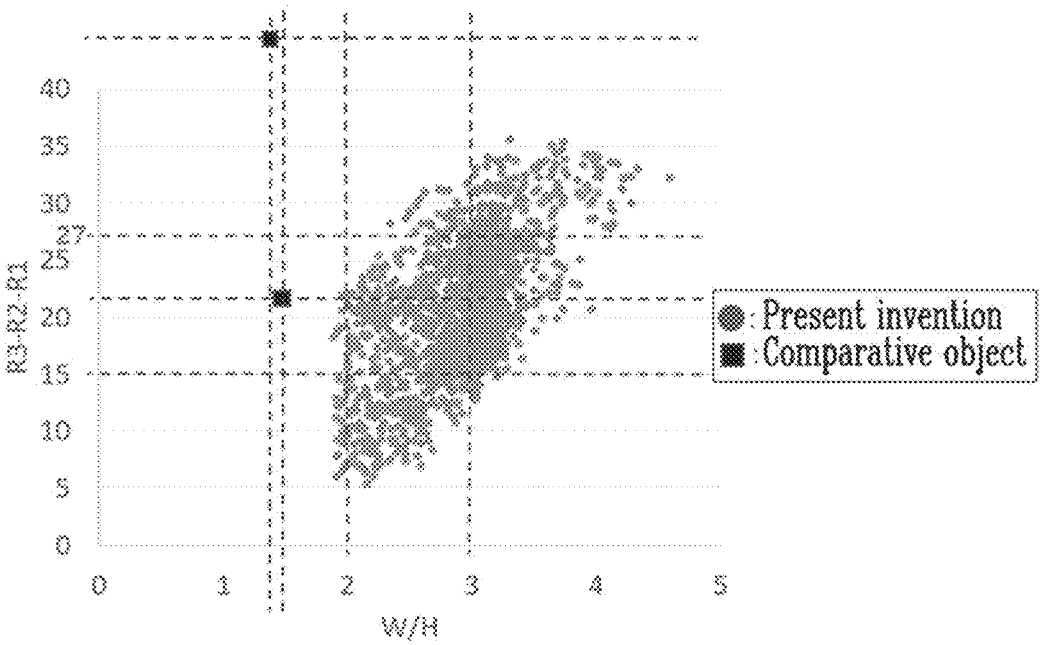
FIG. 37 is a diagram illustrating a range of values of a curvature radius 'r3-r2-r1' according to a ratio (W/H) of a curved portion width to a curved portion height of a primary barrier through an optimization simulation of a cross-sectional shape of a primary barrier.

FIG. 36 is a diagram illustrating a distribution of Mises stress values (thermal stress and pressure stress) according to a ratio (W/H) of a curved portion width to a curved portion height of a primary barrier, and FIG. 37 is a diagram illustrating a range of values of a curvature radius 'r3-r2-r1' according to a ratio (W/H) of a curved portion with to a curved portion height of a primary barrier through an optimization simulation of a cross-sectional shape of a primary barrier.

In the primary barrier 2 of this embodiment, the curved portion 22 has a cross-sectional shape such that the ratio (W/H) of the width (W) between the adjacent flat portions 21 to the height (H) from the flat portion 21 to the upper end of the curved portion 22 is in the range of 2.0 to 3.0 ($2.0 \leq W/H \leq 3.0$) as described above, so as to minimize the thermal stress caused by the low temperature as well as the pressure stress burden caused by the sloshing, and in addition, while the first, second, and third curvature radii r1, r2, r3 of each of the first, second, and third curved portions 22*a*, 22*b*, 22*c* are different from each other, the size of the third curvature radius r3 was made larger than the sum of the size of the second curvature radius r2 and the size of the first curvature radius r1, the cross-sectional shape of the curved portion 22 was obtained by the experimental data shown in FIGS. 36 to 39 below, and in addition, a known primary barrier was compared as a comparative object.

Here, the comparative primary barrier has a large corrugation and a small corrugation, unlike the primary barrier 2 of the present disclosure.

As shown in FIG. 36, considering both thermal stress and pressure stress from Von Mises stress according to the ratio (W/H) of the width (W) of the curved portion 22 to the height (H) of the curved portion 22, in the primary barrier 2 of the present disclosure, thermal stress and pressure stresses were concentrated when the ratio of width to height (W/H) is in the range of 2.0 to 3.0, and in the case of the comparative primary barrier, the ratio of width to height (W/H) of each of the large and small corrugations was about 1.5 or less, and there was a significant difference in thermal stress and pressure stress. In other words, it may be known that the present disclosure having a width to height ratio (W/H) in the range of 2.0 to 3.0 has good both thermal stress and pressure stress compared to a comparative object having a width to height ratio (W/H) of 1.5 or less.

Specifically, in the present disclosure, the thermal stress increases in proportion to the size of the width to height ratio (W/H) of the primary barrier 2, and the pressure stress decreases in inverse proportion to the size of the width to height ratio (W/H) of the primary barrier 2, and when the width to height ratio (W/H) is in the range of 2.0 to 3.0, the distribution of thermal stress and pressure stress is concentrated, and at this time, it may be seen that the primary barrier 2 of the present disclosure has a thermal stress and a pressure stress between 110 MPa and 210 MPa.

On the other hand, the in the comparative object, the maximum thermal stress was about 73 MPa and the maximum pressure stress was about 310 MPa in the large corrugation where the width to height ratio (W/H) of the primary barrier was about 1.5 or less, and the maximum thermal stress and maximum pressure stress were about 150

MPa in the small corrugation where the width to height ratio (W/H) of the primary barrier was 1.5 or less.

In addition, as shown in FIG. 37, in the present disclosure, when the width to height ratio (W/H) of the primary barrier 2 is in the range of 2.0 to 3.0, and the curvature radius 'r3-r2-r1' value is in the range of 10 mm~30 mm, preferably in 15 mm~27 mm, the cross-sectional shape optimization result of the primary barrier 2 was obtained.

On the other hand, in the comparative object, when the width to height ratio (W/H) of the large corrugation and the small corrugation of the primary barrier is about 1.5 or less, the curvature radius 'r3-r2-r1' value of the large corrugation was about 48 mm, and the curvature radius 'r3-r2-r1' value of small corrugation was about 21 mm, and from this, it may be seen that the comparative primary barrier is different from the cross-sectional shape of the primary barrier 2 of the present disclosure.

Meanwhile, the primary barrier 2 of the present disclosure has a yield stress of 170 Mpa at room temperature, and about 220 Mpa at a low temperature of −170 degrees, and since it is manufactured at room temperature, a range not exceeding 170 Mpa to 180 MPa is required.

Accordingly, the primary barrier 2 of this embodiment may be desirable to have a thermal stress (y=72.446e0.3522x) or a pressure stress (y=255.95e-0.233x) that does not exceed about 170 MPa, and a shape in which the width to height ratio (W/H) is in the range of 2.0 to 3.0, and the value of 'r3-r2-r1' in the range of 15 mm~27 mm that satisfies 170 MPa or less to be differentiated from the comparative object.

In Table 3 below, the distribution of thermal stress and pressure stress from the Von Mises stress according to the ratio (W/H) of a curved portion 22 width (W) to a curved portion 22 height (H) of a primary barrier is shown in a diagram.

TABLE 3

| W/H | Thermal stress (y = 72.446e0.3522x) | Compression stress (y = 255.95e−0.233x) |
|---|---|---|
| 2.0 | 146.5 | 160.6 |
| 2.1 | 151.8 | 156.9 |
| 2.2 | 157.2 | 153.3 |
| 2.3 | 162.9 | 149.8 |
| 2.4 | 168.7 | 146.3 |
| 2.5 | 174.7 | 142.9 |
| 2.6 | 181.0 | 139.7 |
| 2.7 | 187.5 | 136.4 |
| 2.8 | 194.2 | 133.3 |
| 2.9 | 201.2 | 130.2 |
| 3.0 | 208.4 | 127.2 |

Figure 38A:
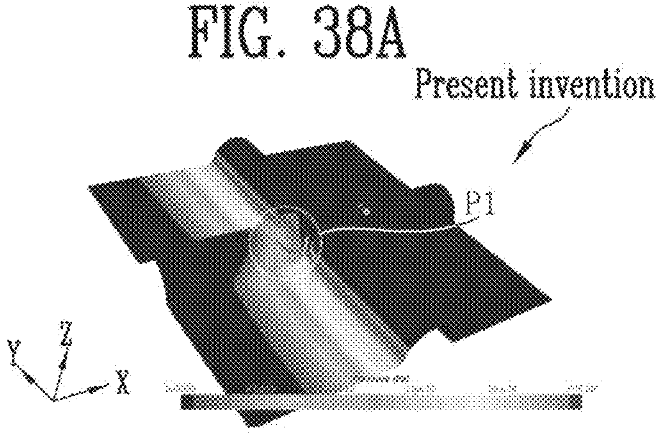
FIGS. 38A, 38B and 38C are diagrams illustrating the results of structural analysis of a sloshing pressure value when a fluid flows into a horizontal and vertical curved portions from a primary barrier of the present disclosure and a primary barrier of a comparative object.
Figure 38B:
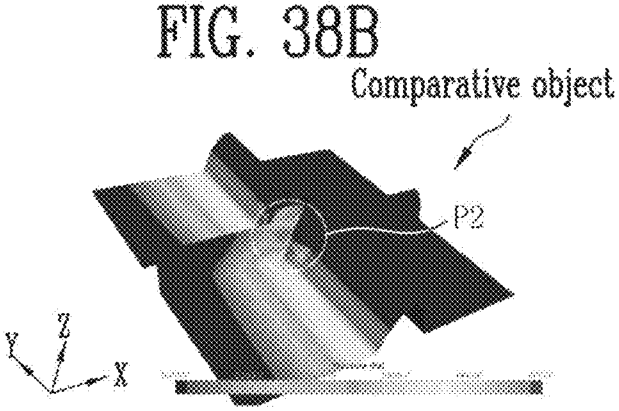
Figure 38C:
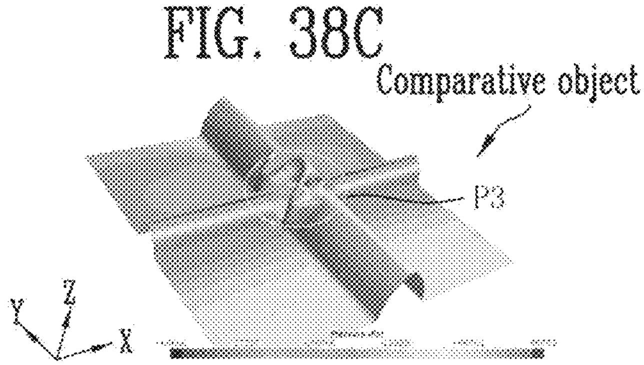

FIGS. 38A B and C are diagrams illustrating the results of structural analysis of a sloshing pressure value when a fluid flows into a horizontal and vertical curved portions from a primary barrier of the present disclosure and a primary barrier of a comparative object, and here, the speed of the fluid flowing into the horizontal and vertical curved portions was set at a speed of 5 m/s. FIG. 38 A is a structural analysis of the sloshing pressure value when the fluid flows into the horizontal or vertical curved portion 22 from the primary barrier 2 of the present disclosure, and a maximum sloshing pressure value of 305.29 Pa was obtained at the first point P1 of the curved portion 22. In addition, FIG. 38 B is a structural analysis of the sloshing pressure value at which the fluid flows to the horizontal curved portion (large corrugation) from the primary barrier of the comparative object, and the maximum sloshing pressure value of 10,515 Pa was obtained at the second point P2 of the horizontal curved portion (large corrugation), and FIG. 38 C is a structural analysis of the sloshing pressure value when the fluid flows into the vertical curved portion (small corrugation) from the primary barrier of the comparative object, and a maximum sloshing pressure value of 3577.6 Pa was obtained at the third point P3 of the vertical curved portion (small corrugation).

Here, while the primary barrier 2 of the present disclosure has a cross-sectional shape in which the size and height of the horizontal and vertical curved portions 22 are the same as described above, in the primary barrier of the comparative object, a large horizontal curved portion (large corrugation) having a general curved cross-sectional shape and a small vertical curved portion (small corrugation) intersect, and it may be seen that the sloshing pressure value of the primary barrier 2 of the present disclosure compared to the primary barrier of the comparative object is excellent in the horizontal curved portion and very excellent in the vertical curved portion.

Figure 39A:
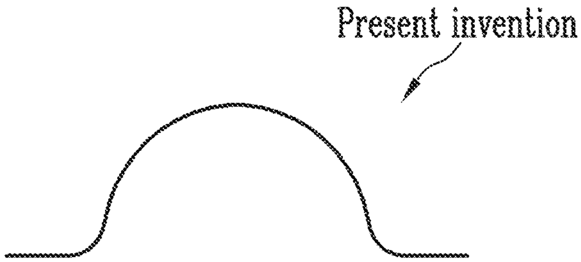
FIGS. 39A and 39B are diagrams for explaining deformation when a uniformly distributed load is applied to a primary barrier of the present disclosure and a primary barrier of a comparative object.
Figure 39B:
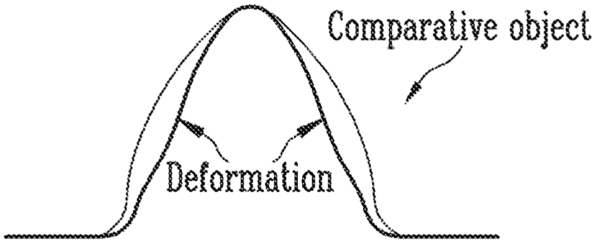

FIGS. 39A and 39B are diagrams for explaining deformation when a uniformly distributed load is applied to a primary barrier of the present disclosure and a primary barrier of a comparative object (a result of structural analysis by sloshing impact pressure), and here, an elastic structural analysis was performed by applying a total impact pressure of 10 bar to the primary barrier. This is to understand the dynamic behavior and the amount of plastic deformation in the cross-sectional shape of the primary barrier. The cross-sectional shape of the curved portion 22 of the primary barrier 2 of the present disclosure shown in FIG. 39 A has a gentler slope than the cross-sectional shape of the curved portion (large corrugation) of the primary barrier of the comparative object shown in FIG. 39 B, and it may be seen that almost no deformation occurs in the primary barrier 2 of the present disclosure, and a large amount of deformation occurs in the primary barrier of the comparative object. As such, in the case of the primary barrier of the comparative object, additional work is required, such as inserting an implant such as a wood wedge or metal at the lower end of the curved portion to prevent deformation.

Although the present invention has been described in detail through specific examples, it is merely to specifically explain the present disclosure, the present invention is not limited thereto, and it will be apparent that modifications or improvements are possible by one of ordinary skill in the art within the technical spirit of the present disclosure.

All simple modifications or changes of the present disclosure fall within the scope of the present disclosure, and the specific scope of protection of the present disclosure will be made clear by the appended claims.

<Explanation of Symbols>

| | |
|---|---|
| 1: Liquefied gas storage tank | 2: Primary barrier |
| 2a: Unit barrier | 21: Flat portion |
| 22: Curved portion | 22a: First curved portion |
| 22b: Second curved portion | 22c: Third curved portion |
| 23: Boundary portion | 24: Protruding structure |
| 3: Primary insulating wall | 3b: Fixed insulating wall |
| 31: Primary plywood | 32: Primary insulating material |
| 3a: Connection insulating wall | 31a: Connection plywood |
| 32a: Connection insulating material | 33: Auxiliary insulating plate |
| 4: Secondary barrier | 41: Main barrier |
| 42: Auxiliary barrier | GAC: Glass-aramid fabric |
| AF: Aluminum foil | GC: Glass fabric |
| BC: Basalt fabric | 5: Secondary insulating wall |
| 51: Secondary insulating material | 52: Secondary plywood |

-continued

| <Explanation of Symbols> | |
|---|---|
| 6: Mastic | 7: Hull |
| 8: Leveling member | 9: Fixing member |
| 91: Protruding portion | 92: Stud bolt |
| A1: First circle | A2: Second circle |
| A3: Third circle | A4: Fourth circle |
| C1: First curvature center | C2: Second curvature center |
| C3: Third curvature center | C4: Fourth curvature center |
| P1: First connection point | P2: Second connection point |
| P3: Third connection point | P4: Fourth connection point |
| r1: First curvature radius | r2: Second curvature radius |
| r3: Third curvature radius | |

The invention claimed is:

1. A liquefied gas storage tank for storing a cryogenic material, comprising:

a primary barrier made of metal to form an accommodating space for accommodating a cryogenic material;

a primary insulating wall in which a primary plywood and a primary insulating material are sequentially disposed to the outside of the primary barrier;

a secondary barrier provided on the outside of the primary insulating wall; and a secondary insulating wall in which a secondary insulating material and a secondary plywood are sequentially disposed in a stack to the outside of the secondary barrier, wherein the secondary barrier comprises:

a main barrier provided on top of each secondary insulating wall constituting a unit element; and an auxiliary barrier configured to connect adjacent main barriers to each other, and wherein the secondary barrier is formed of a mixed material of a metal and a non-metal, and the primary insulating wall has a thickness of 66% to 166% of that of the secondary insulating wall in order to lower a thermal stress, wherein the secondary barrier is disposed in a central region corresponding to 40% to 60% of a total thickness based on a thickness direction in the liquefied gas storage tank.

2. The liquefied gas storage tank of claim 1, wherein the primary insulating wall comprises a connection insulating wall provided in a space portion between adjacent fixed insulating walls in a state where unit elements formed by stacking the secondary insulating wall, the secondary barrier, and the fixed insulating wall which is a part of the primary insulating wall are disposed adjacently.

3. The liquefied gas storage tank of claim 2, wherein the connection insulating wall has a thickness of 67% to 167% of the secondary insulating wall.

4. The liquefied gas storage tank of claim 1, wherein the primary insulating material has a thickness of 90% to 110% of the secondary insulating material.

5. The liquefied gas storage tank of claim 1, wherein the primary barrier includes a flat portion in contact with an upper surface of the primary insulating wall, a curved portion having a first curvature radius, and a boundary portion formed in a wrinkle shape having a second curvature radius between the flat portion and the curved portion, and the first curvature radius and the second curvature radius are different.

6. The liquefied gas storage tank of claim 5, wherein the wrinkle shape has the same horizontal and vertical wrinkle sizes.

7. The liquefied gas storage tank of claim 1, wherein the secondary barrier is formed of a material having a structure in which a first member/an aluminum foil/a second member are stacked, and at least one of the first member and the second member is a glass fabric, a glass-aramid fabric, a basalt fabric, or a glass fabric/aluminum foil/glass fabric.

8. The liquefied gas storage tank of claim 1, wherein the primary insulating material is formed of a reinforced polyurethane foam in which $CO_2$ is used as a foaming agent, and the secondary insulating material is formed of a reinforced polyurethane foam in which a foaming agent HFC-245fa is used.

9. The liquefied gas storage tank of claim 1, further comprising:

a right-angle corner structure, wherein a curvature radius of the secondary barrier formed in the right-angle corner structure is 25% to 50% of the thickness of the primary insulating wall.

10. The liquefied gas storage tank of claim 1, further comprising:

an obtuse-angle corner structure, wherein a curvature radius of the secondary barrier formed in the obtuse-angle corner structure is 15% to 35% of the thickness of the primary insulating wall.

11. A liquefied gas storage tank for storing a cryogenic material, comprising:

a primary barrier made of metal to form an accommodating space for accommodating a cryogenic material;

a primary insulating wall provided on the outside of the primary barrier;

a secondary barrier provided on the outside of the primary insulating wall which comprises a main barrier and an auxiliary barrier; and a secondary insulating wall provided on the outside of the secondary barrier, wherein the primary barrier comprises a plurality of flat portions fixed to an upper surface of the primary insulating wall, and a curved portion formed between the plurality of flat portions to form a curved surface toward the accommodating space and comprising a horizontal curved portion and a vertical curved portion, wherein a cross-sectional shape of the curved portion comprises:

a pair of first curved portions connected to each of the adjacent flat portions and having a first curvature radius r1;

a second curved portion forming an upper portion of the curved portion and having a second curvature radius r2 with a radius at least greater than the first curvature radius r1; and a pair of third curved portions connecting each of the pair of first curved portions and the second curved portion, and having a third curvature radius r3 with a radius at least greater than the second curvature radius r2, and wherein the pair of third curved portions are positioned so that a first curvature center of any one of the third curved portions and a second curvature center of the other third curved portion are shifted in a horizontal direction inside the curved portion.

12. The liquefied gas storage tank of claim 11, where the horizontal curved portion and the vertical curved portion are formed to intersect, and the horizontal curved portion and the vertical curved portion have the same height and width.

13. The liquefied gas storage tank of claim 11, where a size of the third curvature radius is greater than a sum of a size of the second curvature radius and a size of the first curvature radius.

14. The liquefied gas storage tank of claim 11, wherein a ratio (W/H) of a width (W) to a height (H) of the curved portion ranges from 2.0 to 3.0 ($2.0 \leq W/H \leq 3.0$), and is determined based on a thermal stress and a pressure stress at cryogenic temperatures low temperature of the primary barrier.

15. The liquefied gas storage tank of claim 11, wherein each of the pair of first curved portions has a curved shape having the first curvature radius between a first connection point connected to the flat portion and a second connection point connected to each of the pair of third curved portions, the first connection point is the same location as a point where a curve of a first circle having the first curvature radius from a curvature center on the accommodating space side and a vertical center line of the first circle intersect, and the second connection point is located on a curved portion of the first circle within an angle of 30 degrees downward from a point where the curve of the first circle and a horizontal center line of the first circle intersect.

16. The liquefied gas storage tank of claim 11, where the primary barrier is located within a predetermined distance from an intersection where the horizontal curved portion and the vertical curved portion intersect, and further comprises a protruding structure which protrudes toward the accommodating space and is formed on the flat portion.

17. The liquefied gas storage tank of claim 16, wherein the protruding structure is smaller in size than the horizontal curved portion and the vertical curved portion, and is formed in a convex circular or arc shape.

18. The liquefied gas storage tank of claim 11, wherein the first and second curvature centers of the pair of third curved portions are located above an imaginary plane formed by the flat portion.

19. A ship in which the liquefied gas storage tank of claim 1 is provided.

* * * * *